US006379842B1

(12) United States Patent
Mayer

(10) Patent No.: US 6,379,842 B1
(45) Date of Patent: *Apr. 30, 2002

(54) MIXED LITHIUM MANGANESE OXIDE AND LITHIUM NICKEL COBALT OXIDE POSITIVE ELECTRODES

(75) Inventor: Steven T. Mayer, San Leandro, CA (US)

(73) Assignee: PolyStor Corporation, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/413,744

(22) Filed: Oct. 6, 1999

Related U.S. Application Data

(63) Continuation of application No. 09/099,128, filed on Jun. 17, 1998, which is a continuation-in-part of application No. 08/758,007, filed on Nov. 27, 1996, now Pat. No. 5,783,333.

(51) Int. Cl.[7] .................................................. H01M 4/58
(52) U.S. Cl. ...................... 429/231.3; 429/223; 429/224; 429/231.1; 429/218.1
(58) Field of Search ......................... 429/231.1, 231.3, 429/218.1, 223, 224

(56) References Cited

U.S. PATENT DOCUMENTS

| 4,567,031 | A | 1/1986 | Riley .......................... 423/593 |
| 5,053,297 | A | 10/1991 | Yamahira et al. ............ 429/194 |
| 5,084,366 | A | 1/1992 | Toyoguchi .................. 429/224 |
| 5,169,736 | A | 12/1992 | Bittihn et al. ................ 429/194 |
| 5,264,201 | A | 11/1993 | Dahn et al. .................. 423/594 |
| 5,278,000 | A | 1/1994 | Huang et al. ................. 429/91 |
| 5,339,024 | A | 8/1994 | Kuo et al. ................... 324/435 |
| 5,429,890 | A | 7/1995 | Pynenburg et al. ......... 429/192 |
| 5,451,477 | A | 9/1995 | Omaru et al. ................ 429/218 |
| 5,478,671 | A | 12/1995 | Idota ........................... 429/194 |
| 5,478,674 | A | 12/1995 | Miyasaka .................... 429/218 |
| 5,506,075 | A | 4/1996 | Iwasaaki et al. ............. 429/218 |
| 5,753,202 | A | 5/1998 | Wang et al. |
| 6,159,636 | A | 12/2000 | Wang et al. |

FOREIGN PATENT DOCUMENTS

| EP | 486950 A1 | 5/1992 | |
| EP | 486950 A1 * | 5/1992 | .......... H01M/10/40 |
| JP | 02-317348 | 7/1992 | .......... H01M/10/40 |
| JP | 02-408853 | 8/1992 | .......... H01M/10/40 |
| JP | 03-261876 | 4/1993 | ............ H01M/4/58 |

(List continued on next page.)

OTHER PUBLICATIONS

Wang, et al., "Stability of Lithium Ion Spinel Cells III. Improved Life of Charged Cells", Duracell Worldwide Technology Center, Journal of The Electrochemical Society, 147, submitted Jan. 7, 2000, received Jul. 3, 2000, pp. 4023–4028.

(List continued on next page.)

*Primary Examiner*—Carol Chaney
(74) *Attorney, Agent, or Firm*—Beyer Weaver & Thomas, LLP

(57) ABSTRACT

Positive electrodes including a lithium nickel cobalt metal oxide are disclosed. The lithium nickel cobalt metal oxides have the general formula $Li_xNi_yCO_zM_nO_2$, where M is selected from the group consisting of aluminum, titanium, tungsten, chromium, molybdenum, magnesium, tantalum, silicon, and combinations thereof, x is between about 0 and about 1 and can be varied within this range by electrochemical insertion and extraction, the sum of y+z+n is about 1, n ranges between above 0 to about 0.25, y and z are both greater than 0, and the ratio z/y ranges from above 0 to about 1/3. Also disclosed are composite positive electrodes including the above-described lithium nickel cobalt metal oxides together with a lithium manganese metal oxide of the formula $Li_xMn_{2-r}M1_rO_4$, where r is a value between 0 and 1 and M1 is chromium, titanium, tungsten, nickel, cobalt, iron, tin, zinc, zirconium, silicon, or a combination thereof.

21 Claims, 19 Drawing Sheets

Cycling of Various Cathode Types at 50°C

FOREIGN PATENT DOCUMENTS

| | | | |
|---|---|---|---|
| JP | 03-263685 | 4/1993 | H01M/4/58 |
| JP | 04-8928 | 8/1993 | H01M/4/58 |
| JP | 04-300153 | 9/1993 | H01M/4/58 |
| JP | 05-242891 | 9/1993 | |
| JP | 05-155426 | 1/1995 | H01M/4/58 |
| JP | 05-155427 | 1/1995 | H01M/4/58 |
| JP | 05-155428 | 1/1995 | H01M/4/58 |
| JP | 05-174380 | 1/1995 | H01M/10/40 |
| JP | 05-175489 | 1/1995 | H01M/10/40 |
| JP | 05-263696 | 5/1995 | H01M/10/40 |
| JP | 05-263699 | 5/1995 | H01M/10/40 |
| JP | 07-122299 | 5/1995 | |
| JP | 05-347811 | 7/1995 | H01M/4/02 |
| JP | 06-148312 | 1/1996 | H01M/10/40 |
| JP | 07-114688 | 2/1996 | H01M/4/02 |
| JP | 06-269910 | 5/1996 | H01M/4/58 |

OTHER PUBLICATIONS

Xia, et al., "Optimization of Spinel Li$_{1+x}$Mn$_{2-y}$O$_4$ as a 4 V Li–Cell Cathode in Terms of a Li—Mn—O Phase Diagram", Department of Applied Chemistry, Saga University, J. Electrochem. Soc, vol. 144, No. 12, Dec. 1997, pp. 4186–4194.

Ohzuku, et al., "Comparative Study of LiCoO$_2$, LiNi$_{1/2}$Co$_{1/2}$O$_2$ and LiNiO$_2$ for a 4 Volt Secondary Lithium Cells," *Electrochimica Acta*, vol. 38, No. 9, pp. 1159–1167, 1993.

Gummow, et al., "Lithium–cobalt–nickel–oxide Cathode Materials Prepared at 400° C for Rechargeable Lithium Batteries," *Solid–State Ionics*, 53–56, pp. 681–687, 1992.

Reimers, et al., Effects of Impurities of the Electrochemical Properties, of LiCoO$_2$, pp. 2752–2754, *J. Electrochem. Soc.*, vol. 140, No. 10, Oct. 1993.

Ueda et al., "Solid–State Redox Reactions of LiNi$_{1/2}$O$_2$(R3m) for 4 Volt Secondary Lithium Cells," *J Eelctrochem. Soc.*, vol. 141, No. 8, Aug. 1994.

Fuller, et al., "Simulation and Optimization of Dual Lithium Ion Insertion Cell," *J. Electrochem. Soc.*, vol. 141, No. 1, Jan. 1994.

Davidson, et al., "Rechargeable Cathodes Based on Li$_2$Cr$_x$Mn$_{2-x}$04," pp. 463–465, *Abstract for Seventh International Meeting on Lithium Batteries,* Boston, MA, May 15–20, 1995.

Banov, et al., "Cathodes for . . . ," p. 435, *Abstract for Seventh International Meeting on Lithium Batteries,* Boston, MA, May 15–20, 1995.

Nitta et al., "Crystal Structure Study of LiNi$_{1-x}$Mn$_x$O$_2$," pp. 403–432, *Abstract for Seventh International Meeting on Lithium Batteries,* Boston, MA, May 15–20, 1995.

Ohzuku, et al., "Synthesis and Characterization of LiAl$_{0.25}$Ni$_{0.75}$O$_2$ (R3m) . . . ," *J. Electrochem. Soc.,* vol. 142, No. 12, p. 4033 (1995).

U. S. application No. 5,609,972 (U.S. Application No. 08/610,388, Attorney Docket No. POLYP008) entitled "Cell Cap Assembly Having Frangible Tab Disconnect Mechanism," filed Mar. 4, 1996, Kaschmitter, et al.

U.S. application No. 08/598,046 (Attorney Docket No. POLYP007) entitled "Nonaqueous Electrolyte Secondary Battery," (now abandoned), filed Feb. 7, 1996, Mayer, et al.

Doyle, et al., "Modelling of Galvanostatic Charge and Discharge . . . " *J. Electrochem. Soc.,* vol. 140, No. 6, (1993).

Howard Jr., et al., "Meeting Abstracts, Spring Meeting," *J. Electrochem. Soc.,* Los Angeles, CA, May 5–10, 1996, vol. 96–1, pp. 64–65.

Okada, et al., "Synthesis and Echem. Characteristics of Li(NiM)02 . . . ," *8th Int. Meeting on Lithium Batteries,* Jun. 16–21, 1996, Nagoya, Japan, Extended Abstracts IB–B–10, pp. 424–425.

Ohzuku, "An Innovative Insertion Material . . . ," *8th Int. Meeting on Lithium Batteries,* Jun. 16–21, 1996, Nagoya, Japan, Extended Abstracts THU–06, pp. 123–124.

Zhong, et al., "Crystal Structures and Electrochem. Props. of LiAlyNil–y02 Solid Soln.," J. Power Sources, 54, pp. 221–223 (1995).

\* cited by examiner

| Compound | Test | Result |
| --- | --- | --- |
| $LiNiO_2$ | Crush with flat plate | Explosion/flame |
| $LiNiO_2$ | 150°C Exposure | Explosion/flame |
| 50% $LiMn_2O_4$ 50% $LiNiO_2$ | Crush with flat plate | Explosion/flame |
| 50% $LiMn_2O_4$ 50% $LiNiO_2$ | 150°C Exposure | Explosion/flame |
| 75% $LiMn_2O_4$ 25% $LiNiO_2$ | Crush with flat plate | No Explosion/flame |
| 75% $LiMn_2O_4$ 25% $LiNiO_2$ | 150°C Exposure | No Explosion/flame |
| $LiNi_{0.8}Co_{0.2}O_2$ | Crush with flat plate | Explosion/flame |
| $LiNi_{0.8}Co_{0.2}O_2$ | 150°C Exposure | Explosion/flame |
| 30% $LiMn_2O_4$ 70% $LiNi_{0.8}Co_{0.2}O_2$ | Crush with flat plate | No Explosion/flame |
| 30% $LiMn_2O_4$ 70% $LiNi_{0.8}Co_{0.2}O_2$ | 150°C Exposure | No Explosion/flame |
| 50% $LiMn_2O_4$ 50% $LiNi_{0.8}Co_{0.2}O_2$ | Crush with flat plate | No Explosion/flame |
| 50% $LiMn_2O_4$ 50% $LiNi_{0.8}Co_{0.2}O_2$ | 150°C Exposure | No Explosion/flame |

Figure 16A

| Compound | Test | Result |
|---|---|---|
| $LiNiO_2$ | Continuous 1C charging | Explosion |
| $LiNiO_2$ | Continuous 3C overcharging | Explosion |
| 50% $LiMn_2O_4$ 50% $LiNiO_2$ | Continuous 1C charging | Explosion |
| 50% $LiMn_2O_4$ 50% $LiNiO_2$ | Continuous 3C charging | Explosion |
| $LiCoO_2$ | Continuous 1C charging | No flame or explosion |
| $LiCoO_2$ | Continuous 3C charging | Explosion |
| 50% $LiMn_2O_4$ 50% $LiNi_{0.8}Co_{0.2}O_2$ | Continuous 1C overcharging | No flame or explosion Max temp 125°C |
| 50% $LiMn_2O_4$ 50% $LiNi_{0.8}Co_{0.2}O_2$ | Continuous 3C overcharging | No flame or explosion Max temp 130°C |

Figure 16B

MIXED LITHIUM MANGANESE OXIDE AND LITHIUM NICKEL COBALT OXIDE POSITIVE ELECTRODES

This is a Continuation application of co-pending prior application Ser. No. 09/099,128 filed on Jun. 17, 1998, the disclosure of which is incorporated herein by reference.

This application is a continuation-in-part of U.S. patent application Ser. No. 08/758,007, filed Nov. 27, 1996, now U.S. Pat. No. 5,783,333, having S. Mayer as inventor, and titled LITHIUM NICKEL COBALT OXIDES FOR POSITIVE ELECTRODES. That application is incorporated herein by reference in its entirety and for all purposes.

BACKGROUND OF THE INVENTION

The present invention relates to positive electrodes for use in electrochemical energy storage devices. More particularly, the invention relates to lithium insertion positive electrodes containing either lithium nickel cobalt oxides or mixtures of such materials with other compounds.

Due to the increasing demand for battery-powered electronic equipment, there has been a corresponding increase in demand for rechargeable battery cells having high specific energies. In order to meet this demand, various types of rechargeable cells have been developed, including improved aqueous nickel-cadmium batteries, various formulations of aqueous nickel-metal hydride batteries and, recently, non-aqueous rechargeable lithium-ion cells (sometimes referred to as "lithium rocking chair," or "lithium intercalation" cells). Lithium-ion cells are particularly attractive because they have a high cell voltage and a high specific energy.

Various positive electrodes ("cathodes" on discharge) have been studied and/or used in lithium ion batteries. These include lithium molybdenum sulfides, lithium molybdenum oxides, lithium vanadium oxides, lithium chromium oxides, lithium titanium oxides, lithium tungsten oxides, lithium cobalt oxides, lithium nickel oxides, and lithium manganese oxides. The preparation and use of lithium transition metal oxide positive electrodes are described in various publications including U.S. Pat. Nos. 4,302,518 and 4,357,215 issued to Goodenough et al., which are incorporated herein by reference for all purposes While these materials, particularly lithium cobalt oxide ($LiCoO_2$), lithium nickel oxide ($LiNiO_2$), and lithium manganese oxide spinel ($LiMn_2O_4$), have been found somewhat adequate, they each have some serious shortcomings. For example, they may have an unacceptably high irreversible capacity loss. This loss occurs during a first charge cycle when the cell's negative electrode undergoes formation.

"Formation" refers to electrode modification processes employed after a cell is assembled, but before it is reversibly cycled; note that some but not all cell types require formation. In cells that require it, formation electrochemically modifies the cell's electrodes so that thereafter they can be reversibly cycled. In lithium ion cells, formation involves an initial cycle which irreversibly drives some lithium ions from the positive electrode material to a carbon negative electrode ("anode" on discharge) where they are believed to form a surface layer that has been found necessary to provide high energy cycling. This surface layer is known as a solid electrolyte interface or "SEI."

The ratio of the first cycle charge capacity over the first cycle discharge capacity for a positive electrode is an important parameter in lithium ion cell design. This ratio should be compared to the same ratio for the cell's negative electrode. In all cases, the positive electrode's first cycle capacity ratio should be designed to match the negative electrode's first cycle capacity ratio. If the positive electrode ratio exceeds the negative electrode ratio, lithium metal electroplating can occur, which can result in undesirable capacity fading and safety problems. In the case where this ratio is larger for the negative electrode, the cell's reversible capacity is limited by the negative electrode. Likewise, when the opposite is true, the cell is limited by the positive electrode.

The problem of a positive electrode with a high first cycle ratio can be further understood by considering the example of lithium nickel oxide. As this material has a high first cycle charge ratio, less of it is required to "form" a given amount of carbon negative electrode than is required to reversibly cycle against that same amount of negative electrode (assuming that the negative electrode has a lower first charge ratio). Thus, if a cell is provided with an amount of lithium nickel oxide sufficient for formation, that cell will have insufficient lithium nickel oxide to utilize the available negative electrode material during subsequent reversible cycles. That is, the negative electrode will be underutilized, with some fraction of it constituting useless mass (which reduces the cell's specific energy). On the other hand, if more lithium nickel oxide is used in the cell (beyond that required for formation), some metallic lithium will electroplate onto the negative electrode during formation, presenting the danger that the electroplated lithium metal will undergo an exothermic chemical reaction.

By designing a mixed oxide to include nickel plus another metal which tends to equalize the amount of oxide required to reversibly cycle against and form a given amount of negative electrode material, the above difficulties can be mitigated. Lithium nickel cobalt oxides are potentially useful candidates for such applications because the presence of cobalt does, in fact, tend to equalize the amount of oxide required for these two functions. Note that, in contrast to lithium nickel oxide, more lithium cobalt oxide is required to form a negative electrode than to reversibly cycle against it. Thus, it intuitively follows that the presence of cobalt in a nickel oxide will tend to match the formation capacity and reversible capacity of the oxide.

The presence of cobalt has another advantage. During reversible cell cycling, it reduces the average oxidation state of transition metals in the oxide lattice. A fresh uncycled positive electrode could have the formula $LiMO_2$, with the valence of M being equal to 3. On fall charge, the positive electrode oxide could in theory have a formula $MO_2$, with the valence of M being equal to 4. Thus, during charge the transition metal's oxidation state increases, and during discharge the transition metal's oxidation state decreases. Because some lithium in the positive electrode is irreversibly lost during the formation cycle, the positive electrode matrix can never discharge the whole way to its initial stoichiometry of $LiMO_2$. As a consequence, the valence of M is never lowered all the way to 3 (during normal reversible cycling). Rather, the oxidation state of M is bracketed between a value greater than 3 and a value lower than 4 during reversible cycling. The bounds of this oxidation state are determined by how much lithium is lost during formation.

Obviously, compounds with high irreversible capacity losses will cycle at higher average oxidation states of M than compounds with lower irreversible capacity losses. Lithium nickel oxide has a much higher irreversible capacity loss (about 40 mA·hr/gm) than lithium cobalt oxide (about 8 mA·hr/gm). The introduction of cobalt into the $LiNiO_2$ matrix reduces the irreversible capacity loss and thereby reduces the oxidation state of M during reversible cycling. As a consequence, the oxide lattice is at a lower oxidation state and therefore less reactive and less likely to pose a significant safety risk.

Nevertheless, $LiNi_aCo_bO_2$ compounds still pose the risk of decomposing on severe overcharge. Such decomposition reaction is accompanied by a release of oxygen and energy which increases the cell's internal temperature and pressure, and thereby increases the risk of igniting the electrolyte. Obviously, designs that avoid these potential problems will be of significant commercial importance.

Note that the lithium cobalt oxide and lithium nickel oxide also may undergo a decomposition reaction on overcharge. Generally, it is known that $LiCoO_2$, $LiNiO_2$ and $LiMn_2O_4$ have varying degrees of thermal stability in their delithiated forms (see, e.g., J. R. Dahn et al., Solid State Ionics 69 (1994) 265–270). For example, it is known that the layered compound $LiNi_{0.5}O_2$ is transformed to the spinel $LiNi_2O_4$ on heating to above 200° C. This transformation is accompanied by little mass loss or heat generation. In contrast, at higher degrees of delithiation (e.g., $Li_{0.3}NiO_2$), the transformation to spinel is also accompanied by significant oxygen generation and heat liberation. Delithiated $LiCoO_2$ does not undergo a transformation to spinel form, but rather decomposes to layered $LiCoO_2$ and stable $Co_3O_4$ at about 245° C. Some oxygen is also released in this reaction.

Still other problems remain in many lithium metal oxide positive electrodes. For example, many lithium metal oxides (e.g., $LiMn_2O_4$, $LiCoO_2$, $LiNiO_2$, and some atomic mixtures of Mn, Co, and Ni oxides) have substantially flat discharge profiles. That is, their voltage varies only slightly with state of charge until very nearly all of their capacity has been exhausted. Thus, from full charge until nearly complete discharge (during which time most available lithium enters the positive electrode), the electrode voltage remains high and nearly constant. Only when most available lithium has been extracted from positive electrode (at the end of discharge) does it exhibit a characteristic sharp drop in voltage. While such discharge characteristics provide high and relatively constant potentials during most of discharge, they can cause cells to perform poorly at high rates of discharge. This results because ohmically caused variations of potential within the electrode can not be compensated by variations in the reaction rate. Thus, the electrode material is under-utilized at any given state of discharge, thereby limiting the rate, energy, and cycling performance of cells, as discussed in T. Fuller et al. J. Electrochem. Soc., 1, 114 (1994), incorporated herein by reference for all purposes.

In view of the above, there is a need for improved lithium insertion positive electrode materials which have substantially matched formation and reversible cycling capacities, resist decomposition on overcharge, and have sloping discharge profiles.

SUMMARY OF THE INVENTION

The present invention provides improved positive electrode materials containing compounds of the following formula: $Li_xNi_yCo_zM_nO_2$, where M is selected from the group consisting of aluminum, titanium, tungsten, chromium, molybdenum, magnesium, tantalum, silicon, and combinations thereof, x is between about 0 and about 1 and can be varied within this range by electrochemical insertion and extraction, the sum of y+z+n is about 1, n ranges between above 0 to about 0.25, y and z are both greater than 0, and the ratio z/y ranges from above 0 to about 1/3. Preferably, the compound has an α-$NaCrO_2$ crystal structure.

These materials have the advantage of maintaining capacity better than lithium nickel oxide on repeated cycling. They also have the advantage of being relatively safe in comparison to lithium nickel oxide and lithium cobalt oxide. It is believed that their conductivity is reduced on overcharge (i.e., at low lithium contents), thereby preventing current from continuing to drive detrimental overcharge reactions.

The lithium nickel cobalt metal oxides of this invention may be prepared by various routes. In one preferred embodiment, they are prepared as follows: combining (i) a lithium composition including at least one of lithium carbonate, lithium hydroxide, lithium acetate, and lithium nitrate, (ii) at least one of a metal hydroxide, a metal oxide, an elemental metal, or a metal carbonate containing M, (iii) a cobalt composition including at least one of cobalt oxide, cobalt hydroxide, cobalt carbonate, cobalt acetate, and cobalt nitrate, and (iv) a nickel composition including at least one of nickel hydroxide, nickel carbonate, nickel acetate, and nickel nitrate; and (b) thermally reacting the combination of (i), (ii), (iii) and (iv) at a temperature of between about 500 and 1300° C., more preferably at about 600 to 1000° C., and most preferably at about 750 to 850° C.

The compounds of this invention may be used in mixture with one or more other compounds to form composite positive electrodes having high capacity, long cycle life, and good safety. Preferably the mixture includes a lithium manganese oxide compound in addition to the lithium nickel cobalt metal oxide. More preferably, the lithium manganese oxide compound is lithium manganese oxide ($LiMn_2O_4$) or a lithium manganese metal oxide such as $LiMn_{2-r}M1_rO_4$, where M1 is tungsten, titanium, chromium, nickel, cobalt, iron, tin, zinc, zirconium, silicon, or a combination thereof, and r ranges between about 0 and 1. Preferably, r ranges from about 0 to 0.08. In a particularly preferred embodiment, the mixture includes one of the above two listed manganese compounds together with a lithium nickel cobalt aluminum oxide (e.g., $LiNi_{0.6}Co_{0.15}Al_{0.25}O_2$).

In a related embodiment, the positive electrode includes a mixture of lithium nickel cobalt oxide (containing no aluminum or other non-lithium metal) together with $LiMn_{2-r}M1_rO_4$.

Yet another aspect of the invention provides a lithium ion cell which may be characterized as including (a) a cell container; (b) a negative electrode provided within the cell container and capable of intercalating lithium during charge and deintercalating lithium during discharge; (c) an electrolyte conductive to lithium ions and provided within the cell container; and (d) a positive electrode provided within the cell container and capable of taking up lithium on discharge and releasing lithium on charge. The positive electrode includes a compound or mixture of compounds as described above. Preferably the negative electrodes in such cells include a mixture of homogeneous graphitic carbon particles and homogeneous non-graphitic carbon particles. When such mixed carbon negative electrodes are employed, it will be particularly desirable to employ a positive electrode of lithium nickel cobalt oxide admixed with lithium manganese metal oxide. Further, the electrolytes in cells of this invention preferably include a mixture of ethylene carbonate, diethyl carbonate, and dimethyl carbonate with a dissolved lithium containing salt such as at least about 0.8 molar $LiPF_6$, $LiBF_4$, or $LiN(SO_2C_2F_5)_2$. In an especially preferred embodiment, the electrolyte includes about 1.39 molar $LiPF_6$. Other electrolytes may include one of the following solvent mixtures: (1) ethylene carbonate, ethyl methyl carbonate, and dimethyl carbonate; (2) ethylene carbonate, ethyl methyl carbonate, and diethyl carbonate; and (3) ethylene carbonate, ethyl methyl carbonate, diethyl carbonate, and dimethyl carbonate. The electrolyte may also include a polymer or gelling agent These and other features of the present invention will be presented in more detail in the following specification of the invention and in the figures.

BRIEF DESCRIPTION OF THE DRAWING

FIG. 16A presents the results of a crush test and a 150° C. exposure test on cells constructed in accordance with this invention.

FIG. 16B presents the results of an overcharge test on cells constructed in accordance with this invention.

DESCRIPTION OF THE PREFERRED EMBODIMENTS

Figure 1:
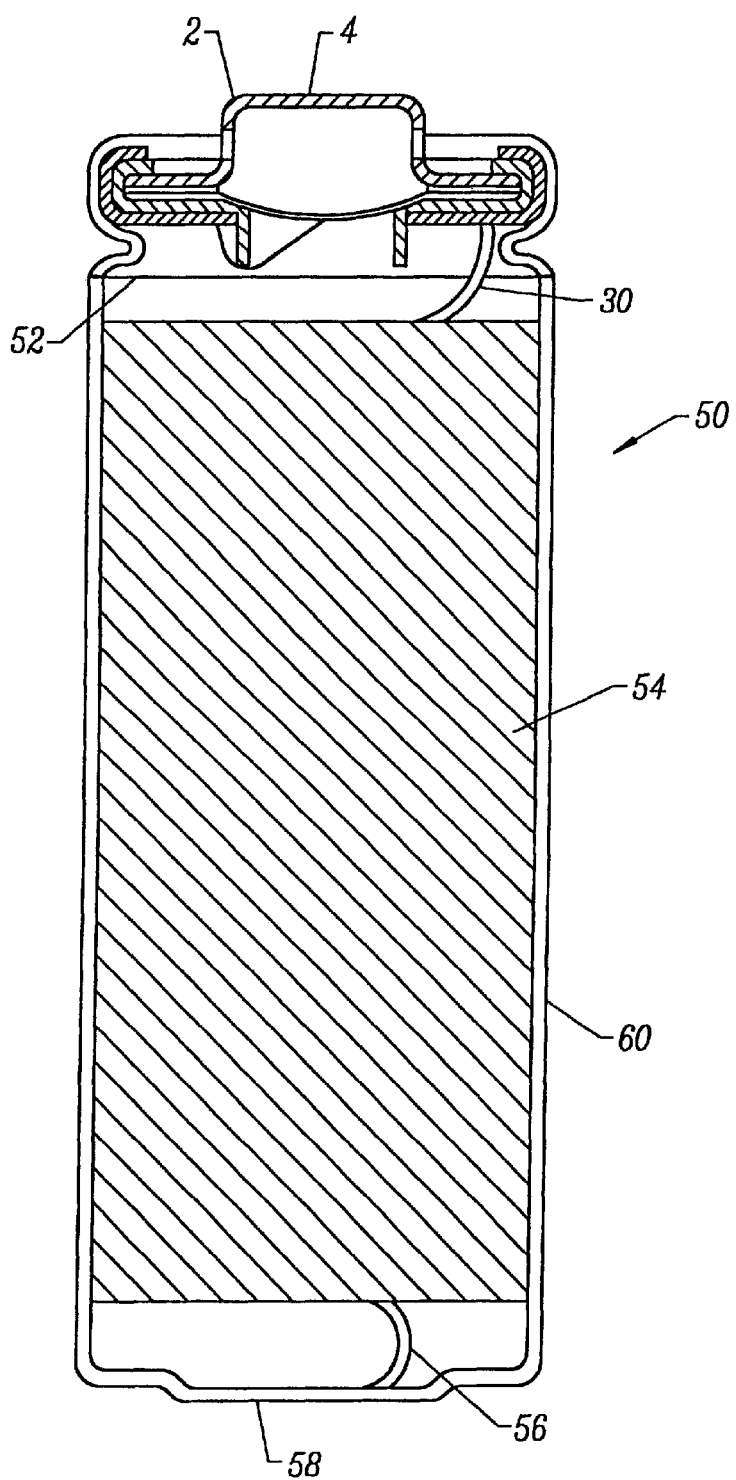
FIG. 1 is an illustration of a lithium ion cell in accordance with one embodiment of the present invention.

1. Lithium Metal Oxides Containing Nickel, Cobalt, and a Third Metal

The present invention provides a composition of matter including a chemical compound of the formula $Li_xNi_yCO_zM_nO_2$, where M is selected from the group consisting of aluminum, titanium, tungsten, chromium, molybdenum, magnesium, tantalum, silicon, and combinations thereof, x is between about 0 and about 1 and can be varied within this range by electrochemical insertion and extraction, the sum of y+z+n is about 1, n ranges between above 0 to about 0.25, y and z are both greater than 0, and the ratio z/y ranges from above 0 to about 1/3. Note that if M is not a metal with a valence state of +3 (e.g., magnesium or silicon), the sum of y+z+n may deviate somewhat from 1. For metals of valence +2 such as magnesium, the sum will be slightly larger than I in order to balance the −4 charge on the two oxygen atoms. And for metals of valence +4 such as silicon, the sum will be slightly less than 1.

Generally, these compounds have the layered structure α-$NaCrO_2$ crystals. Thus, lithium ions can move through the lattice rapidly, along the lattice's planes. This structure is also found in $LiCoO_2$ and $LiNiO_2$. However, $LiMn_2O_4$ spinel has a substantially different structure.

Generally, these compounds have a significantly greater variation in potential with state of charge (i.e., sloping discharge profile) than the corresponding simple oxides, particularly $LiCoO_2$. The nickel imparts a very high capacity to these compounds. Depending upon the relative amounts of cobalt and other metals in the compound, any given compound may have a reversible capacity in the neighborhood of 100 to 190 mAhr/gm. For comparison, $LiCoO_2$ has a capacity of about 139 mAhr/gm and $LiMn_2O_4$ has a capacity of about 110 mAhr/gm.

The presence of cobalt appears to improve the compound's stability by holding the other transition metal atoms, especially nickel, in place within the lattice.

It is known that the transition metal atoms of some lithium transition metal oxides are relatively mobile. For example, in the cases of $LiNiO_2$ and $LiMn_2O_4$, the transition metal atoms may be easily moved from their normal lattice sites to lithium sites. This mobility is evident in the compounds both as synthesized and during electrochemical cycling. When the transition metal atoms are actually displaced, electrodes made from these materials can exhibit capacity fading, voltage reduction, and metal dissolution (in the case of the manganese compound). For $LiNiO_2$, the metal atoms are close enough in size to lithium to move into the layer planes normally reserved for lithium. It is believed that synthesizing $LiNiO_2$ under oxidizing conditions drives the nickel atoms into their appropriate lattice locations and suppresses the transformation to the spinnel form. Nevertheless, the nickel atoms can become dislodged during subsequent electrochemical cycling. For $LiMn_2O_4$, transposition of manganese from its octahedral sites in the spinnel structure is believed to cause poor cycling.

In $LiMn_2O_4$, the mobility problem can be mitigated by (1) synthesizing the compound under conditions providing excess lithium (e.g., in the form of from 3–10% excess $LiCO_3$) or (2) substituting certain transition metals for manganese (e.g., providing 0.5 to 8 mole % chromium or cobalt in place of manganese). These modifications have been found to reduce the ratio of charge to discharge on the first cycle, and unfortunately also reduce reversible capacity.

Substitution of up to 25 mole percent cobalt for nickel in $LiNiO_2$ provides intermetallic lithium metal oxides which are easier to synthesize (versus $LiNiO_2$), retain the high reversible capacity of $LiNiO_2$, improved cycleability, and show a substantial reduction in irreversible capacity loss on first charge. The addition of cobalt to the nickel compound also reduces the amount of oxygen released and the heat of reaction on overcharge, thereby providing additional safety over that of stoichiometric $LiNiO_2$. Still further, this addition substantially reduces the charge/discharge ratio of the compound thereby lowering the average oxidation state of the material, and making the cell an anode limited cell after formation (in contrast to the excess lithium available from the $LiNiO_2$ above that needed by the carbon's first charge).

In view of the advantages that can be attained by adding cobalt as described in two-component mixed oxides, cobalt is also employed in the three-component mixed oxides of the present invention.

The presence of the third metal (M) in the lattice may further improve cell safety on overcharge. As mentioned, the lithium metal oxides, particularly lithium nickel oxide, may undergo exothermic decomposition with the release of oxygen on overcharge. This and other deleterious overcharge reactions depend upon the continued conductivity of the positive electrode. If the lithium metal oxide compound were to become non-conductive in a highly delithiated state, the damage from overcharge could be reduced—particularly by preventing the exothermic degradation of the material.

The aluminum, titanium, and tungsten containing compounds of this invention (i.e., $Li_xNi_yCO_zAl_nO_2$, $Li_xNi_yCO_zTi_nO_2$, and $Li_xNi_yCO_zW_nO_2$) are believed to sharply decrease in conductivity when they become highly delithiated (on overcharge). During normal cell operation (at lithium stoichiometries between above 0 and up to about 0.75), these compounds have good conductivity. However, on overcharge when the lithium stoichiometry approaches 0, it is believed that conductivity drops off markedly. Thus, the overcharge reaction is slowed or stopped before dangerous conditions arise within the cell. This behavior has been observed in lithium nickel aluminum oxides. See "Synthesis of $LiAl_{1/4}Ni_{3/4}O_2$ for Lithium Ion Batteries", T. Ohzuku et al., J. Electrochem. Soc. 142 (1995) pg. 4033. This article is incorporated herein by reference for all purposes.

Note that $LiNi_yAl_{1-y}O_2$ and related compounds do not undergo a significant exothermic decomposition reaction. Thus, the addition of aluminum, titanium, and tungsten to a nickel cobalt oxide parent compound can be expected to reduce or eliminate the heat of decomposition associated with the $LiNiO_2$ compound. This represents a further safety improvement of the three metal $Li_xNi_yCO_zM_nO_2$ compounds of this invention.

It should be understood that some lithium oxides having four or more other metals are also within the scope of this invention. Such compounds have the general formula, $Li_xNi_yCO_z(M_nM1_{n1}M2_{n2}M3_{n3} \ldots )O_2$, where the ratio of y/z is again not less than 3/1, the sum y+z+n+n1+n2+n3+ . . . nn is about equal to 1, and the sum n+n+n2+n3+ . . . nn is not greater than about 0.25. One such class of compounds is $Li_xNi_yCo_zAl_nMn_{n1}O_2$. A specific preferred compound is $LiNi_{0.60}Co_{0.15}Al_{0.010}Cr_{0.10}Mn_{0.05}O_2$.

The positive electrodes of this invention preferably include the following components in addition to the lithium nickel cobalt metal oxides described above: a binder, an electronic conductor, a material that controls the acidity/basicity of the electrolyte solution (i.e., a buffer), and in some cases a material which protects against corrosion. Preferably, the resulting positive electrode material is provided as a film affixed to a current collector such as an aluminum foil or expanded metal.

2. Composite Electrode Compositions

While the above-described modifications to $LiNi_yCO_zO_2$ compounds offer improved thermal stability, cycling, and first cycle charge/discharge ratios, in certain cell designs further chemical modifications to the positive electrode design may be desirable to assure a safe cell design. This is particularly relevant in those electrode designs with relatively low surface area to volume ratios—such as large cells or cylindrical cells with relatively large diameters—where the danger of a run away reaction is greater. To address this issue, one aspect of the present invention provides composite electrodes.

Composite positive electrodes of this invention include a "mixture" of lithium nickel cobalt metal oxides and one or more other chemically-homogeneous electrochemically-active positive electrode materials. The lithium nickel cobalt metal oxide has the formula $Li_xNi_yCO_zM_nO_2$, where M is selected from the group consisting of aluminum, titanium, tungsten, chromium, molybdenum, magnesium, tantalum, silicon, and combinations thereof, x is between about 0 and about 1 and can be varied within this range by electrochemical insertion and extraction, the sum of y+z+n is about 1, n ranges between 0 to about 0.25, y is greater than 0, at least one of z and n is greater than zero, and the ratio z/y ranges from about 0 to about 1/3. This covers three important classes of materials: (i) $Li_xNi_yCO_zM_nO_2$, where M, x, y, z, and n have been defined above in the pure component case, (ii) $Li_xNi_yCo_zO_2$, where x, y, and z have been defined above, with y+z equaling about 1 because no M component is present, and (iii) $Li_xNi_yM_nO_2$, where x, y, and n have been defined above, with y+n equaling about 1 because no cobalt is present.

The term "mixture" is used herein in the sense commonly employed in the chemical arts. Thus, a mixture of oxides in accordance with this invention is composed of distinct chemical species, and, in theory, can be separated by physical means. Typically, the mixtures of this invention will include "particles" of a first chemically distinct positive electrode material interspersed with "particles" of a second chemically distinct positive electrode material. However, other forms are possible, so long as there are sharp phase boundaries between the distinct component materials. Various forms of both constituent positive electrode materials may be employed in the electrodes of this invention. Such particles may each assume various shapes such has fibers, plates, spheres, crystallites, etc. In each case, the morphology of the particle may be somewhat smooth, rough, jagged, porous, fractious, etc. Still further, the size of the particles may vary widely from dust at one extreme to large continuous structures at the other extreme. In the latter case, the material making up the large structure will be interspersed with smaller particles of the material making up other component. Preferably, the particle size is between about 2 and 60 $\mu$m and more preferably between about 4 and 40 $\mu$m.

Preferably, at least one of the positive electrode materials (besides the lithium nickel cobalt metal oxide) is a lithium manganese oxide compound. More preferably, the lithium manganese oxide compound is a lithium manganese oxide with a spinel structure $Li_xMn_2O_4$ or a lithium manganese metal oxide such as $Li_xMn_{2-r}M1_rO_4$ with a spinel structure, where M1 is tungsten, titanium, chromium, nickel, cobalt, iron, tin, zinc, zirconium, or silicon, x is as defined above, and r ranges between about 0 and 1. Preferably, r ranges between about 0 and 0.08. It should be understood that the value of x may frequently exceed 1. This reduces the likelihood that the manganese-oxygen lattice will rearrange on synthesis and cycling. Thus, lithium manganese oxide compounds are frequently synthesized with a slight excess of lithium to produce compounds such as $Li_{1.05}Mn_{2-r}Cr_rO_4$. It should be understood that the normal oxygen stoichiometry of 4 in any of the spinel formulas may not reflect the actual oxygen stoichiometry, which can be significantly different from 4 particularly when x is greater than 1.

Lithium manganese compounds are preferred because they have high thermal stabilities, thereby providing electrodes having a high degree of safety, while still maintaining a high capacity and energy. The acceptable ratios of oxide components in the composite electrodes of this invention primarily depend on results of abuse testing for a particular cell design. Such testing may include subjecting the cell to continued overcharge, or a high temperature environment (e.g., 150° C.). The amount of each component in the mixture therefore could range from about 0 to 100%, depending on the actual cell design and compounds used. This engineering trade-off of maximum energy and capacity while maintaining safety must be determined on a design-by-design basis, and while the tests and calculations are straightforward, the trade-off does not limit the scope of this invention.

$LiMn_2O_4$ spinel and its isomorphic compounds are significantly safer on overcharge and at high temperatures than either $LiNiO_2$ or $LiCoO_2$ (both of which have a layered structure) because the delithiated compound does not decompose, but merely changes its phase in the temperature change of interest (at or slightly below 250 degrees Centigrade) from $\lambda$-$MnO_2$, $\gamma$-$MnO_2$, and/or $\beta$-$MnO_2$ (the delithiated analog of $LiMn_2O_4$) to $\epsilon$-$MnO_2$. This structural rearrangement releases little energy and no oxygen. Thus, overcharged $LiMn_2O_4$ electrodes normally will not undergo a dangerous decomposition reaction. And even if the delithiated electrode is subjected to moderately high temperatures during overcharge, it will still resist further decomposition. Only at temperatures over 400° C. will the $MnO_2$ decompose to $Mn_2O_3$, with release of oxygen.

In a particularly preferred embodiment, the mixture includes at least one of the above two listed manganese compounds together with a lithium nickel cobalt oxide or a lithium nickel cobalt aluminum oxide (i.e., M is aluminum in the above formula for lithium nickel cobalt metal oxides). An example of one preferred lithium nickel cobalt oxide is $LiNi_{0.75}Co_{0.25}O_2$. An example of one preferred aluminum compound is $LiNi_{0.6}Co_{0.15}Al_{0.25}O_2$. Such mixtures have the advantage of good cycling performance, relatively high capacity, and low cost. The genesis of these properties is illustrated in Table 1.

TABLE 1

Approximate Performance Criteria of Oxide Positive Electrodes

|  | Ni/Co/Al | Mn/Cr | $LiCoO_2$ | $LiNiO_2$ |
|---|---|---|---|---|
| Capacity mAhr/gm | 145–190 | 110 | 139 | 185 |
| Cycling Stability | good | low to fair | excellent | fair |
| Safety | fair-good | excellent | good | poor |
| Cost | moderate | low | high | moderate |

The mixture takes advantage of the excellent safety characteristics and very low cost of manganese or manganese/chromium compounds and the high capacity and cycling stability of lithium nickel cobalt aluminum oxides. Note that the lithium nickel cobalt aluminum oxides also possess good safety characteristics especially with significant aluminum concentration. While the cycling stability of stoichiometric $LiMn_2O_4$ (of high capacity) is not particularly good, $LiMn_{2-r}M1_rO_4$ and $Li_{1.05}Mn_2O_4$ often have significantly better cycling performance. Thus, in so far as cycling performance is a concern, it may be preferable to employ $LiMn_{2-r}M1_rO_4$ or $Li_{1.05}Mn_2O_4$.

The capacity of the $Li_xNi_yCO_zAl_nO_2$ improves as aluminum content decreases. Thus, some preferred embodiments employ $Li_xNi_yCO_zO_2$. However, some aluminum content may be desirable to provide additional safety on overcharge and at high temperature. Remember that the presence of aluminum in the compound likely reduces conductivity on overcharge, thereby reducing overcharge current that could cause detrimental results.

Assuming that the first cycle charge/discharge ratios of the positive electrode components do not match that of the negative electrode, it may be desirable to chose relative amounts of the two or more positive electrode materials to provide an "overall" blended first cycle charge/discharge ratio that matches the ratio for the negative electrode. That is, the relative amounts of the two or more positive electrode components are selected such that the total mass of positive electrode material required to form the negative electrode is about equal to the mass of positive electrode material required to reversibly discharge the negative electrode. This optimizes the cell's energy density by utilizing substantially all of the negative electrode and positive electrode materials in each cell cycle. In other words, the cell is neither cathode nor anode limited.

The relative amounts of the two or more materials may be determined empirically or through analysis. In the simplest case, the first cycle charge/discharge ratio is considered to vary linearly with mass fraction of component positive electrode materials. Further details of this approach may be found in published PCT application No. WO 97/01191, with a publication date of Jan. 9, 1997, entitled "NONAQUEOUS ELECTROLYTE SECONDARY BATTERY" (incorporated herein by reference for all purposes).

Obviously, an important design consideration is selecting relative amounts of the two or more positive electrode materials such that the positive and negative electrode first cycle ratios are substantially the same. Generally, any mixture which brings these ratios closer together in comparison to the unmixed materials is desirable. For many composite positive electrode materials, the mixture will be chosen such that the electrode ratios are preferably within about 5% of one another, and more preferably within about 1% of one another.

Table 2 presents some example data of the type that may be useful in determining how much of each positive electrode material to use in a composite positive electrode of this invention. The goal would be to obtain a mixture of two or more positive electrode materials having a first cycle ratio that comes close to that ratio for the carbon anode. Thus, if one positive electrode component has a ratio higher than the negative electrode ratio, then it may be desirable to chose a second component with a ratio lower than the negative electrode ratio. Note that in the examples in Table 2, both the $LiMn_2O_4$ and the $LiNi_{0.8}Co_{0.2}O_2$ have ratios (1.09 and 1.07 respectively) that are lower than ratio of the carbon anode example (1.15). Thus, blends of these positive electrode materials would not match the negative electrode ratio. However, some $Li_xNi_yCO_zM_nO_2$ compounds of this invention will have ratios higher than that of the negative electrode. Also, some negative electrodes will have ratios lower than the 1.15 provided in Table 2. Therefore, it will often be possible to blend the two components to obtain matched ratios.

TABLE 2

| Electrode | 1st Cycle Charge Capacity (mAhr/gm) | 1st Cycle Discharge Capacity (mAhr/gm) | 1st Cycle Ratio | Material Cost | Thermal Stability |
|---|---|---|---|---|---|
| $LiCoO_2$ | 147 | 139 | 1.06 | High | Good |
| $LiNiO_2$ | 225 | 185 | 1.21 | Moderate | Poor |
| $LiMn_2O_4$ | 120 | 110 | 1.09 | Low | Excellent |
| $LiNi_{0.8}Co_{0.2}O_2$ | 193 | 180 | 1.07 | Moderate | Fair |
| Carbon Anode | 368 | 320 | 1.15 | Low | Excellent |

The data in Table 2 was obtained for (1) a commercially supplied $LiCoO_2$ from Westaim Corporation of Fort Sashatchewan, Alberta Canada, (2) high quality $LiNiO_2$ synthesized under an oxygen atmosphere at 750° C. for 24 hours from $LiNO_3$ and NiO, (3) $LiMn_2O_4$ synthesized from $LiCO_3$ and $MnO_2$ (5% molar excess lithium) in air at 600° C. for 24 Hours, and (4) $LiNi_{0.8}CO_{0.2}O_2$ synthesized from $LiNO_3$, NiO, and $Co_3O_4$ in oxygen at 775° C. for 24 hours. The anode data is representative of a typical mixed graphite/non-graphitic anode of the type described hereinafter. The first cycle capacity data is based upon cells charged to 4.2 volts.

While matching the anode and cathode first cycle ratios is desirable, other design considerations may require alternative cathode mixtures. In general, the relative amounts of the two or more materials should be between about 20 and 80% of the manganese compound. More preferably, the mixture contains between about 30 and 60% manganese compound. And most preferably, the mixture contains between about 40 and 60% manganese compound (with a 50:50 mixture being a specific embodiment). Data showing superior performance for cathodes employing such mixtures is presented below.

Regardless of the chemical composition of the positive electrode mixture components, the component particles preferably have an average diameter of less than about 50 μm. The electrochemically active oxide particles of the mixtures may be formed into electrodes by combining with the other materials mentioned above: a binder, an electronic conductor, a material that controls the acidity/basicity of the electrolyte solution, and a material which protects against corrosion. The resulting material may be applied to or formed on a current collector.

In a specific embodiment, the electrode includes the following components: about 43–47 weight percent $LiNi_{0.8}Co_{0.2}O_2$, about 43–47 weight percent $LiMn_2O_4$, about 3–7 weight percent carbon, and about 3–7 weight percent binder (e.g., PVDF). In a particularly preferred embodiment, the concentrations are 45 weight percent $LiNi_{0.8}Co_{0.2}O_2$, 45 weight percent $LiMn_2O_4$, 5.2 weight percent carbon, and 4.8 weight percent binder.

3. Methods of Making Positive Electrodes

Compounds having the formula $Li_xNi_yCo_zM_nO_2$ as described above may be prepared by solid state high temperature reactions as follows. A specified lithium containing compound is combined with a specified "metal" (e.g., aluminum) containing compound, a specified cobalt containing compound, and a specified nickel containing compound. The various components are well mixed and then thermally reacted at a temperature of between about 500 and 1300° C. For many compounds, the reaction is more preferably conducted at a temperature of between about 600 and 1000° C. and most preferably at a temperature of between about 750 and 850° C. In addition, the reaction is preferably carried out in an atmosphere of flowing air or, more preferably, flowing oxygen.

The specified lithium containing compound may be any one or more of lithium nitrate ($LiNO_3$), lithium hydroxide (LiOH), lithium acetate ($LiO_2CCH_3$), and lithium carbonate ($Li_2CO_3$), for example. The specified cobalt containing compound may be any one or more of cobalt metal, cobalt oxide ($Co_3O_4$ or CoO), cobalt carbonate ($CoCO_3$), cobalt nitrate ($Co(NO_3)_2$), cobalt hydroxide ($Co(OH)_2$), and cobalt acetate ($Co(O_2CCH_3)_2$), for example. The nickel containing compound may be any one or more of nickel metal, nickel oxide (NiO), nickel carbonate ($NiCO_3$), nickel acetate ($Ni(O_2CCH_3)_2$), and nickel hydroxide ($Ni(OH)_2$), for example. If the metal containing compound is to provide aluminum, it may be any one or more of aluminum hydroxide ($Al(OH)_3$), aluminum oxide ($Al_2O_3$), aluminum carbonate ($Al_2(CO_3)_3$), and aluminum metal, for example. Other metal containing materials may be employed to provide non-aluminum containing materials such as molybdenum oxide $MoO_3$) titanium oxide ($TiO_2$), tungsten oxide ($WO_2$), chromium metal, chromium oxide ($CrO_3$ or $Cr_2O_3$), magnesium oxide (MgO), tantalum oxide ($Ta_2O_4$ or $Ta_2O_5$), etc.

A similar synthesis technique for forming a lithium aluminum nickel oxide is described in "Synthesis and Characterization of $LiAl_{0.25}Ni_{0.75}O_2$ (R3M) for Lithium-Ion (Shuttlecock) Batteries", J. Electrochem. Soc., Vol. 142, No. 12, p. 4033 (1995). This reference was previously incorporated herein by reference for all purposes.

An alternative synthesis technique involves combining the simple lithium oxides of the metals forming the final compound. This process involves combining lithium cobalt oxide, lithium nickel oxide, and a lithium metal oxide of the formula $LiMO_2$. M is preferably, aluminum, chromium, or titanium. To form $LiNi_{0.6}CO_{0.15}Al_{0.25}O_2$, for example, $LiNiO_2$, $LiCoO_2$, and $LiAlO_2$ could be mixed in a 60:15:25 molar ratio. The resulting mixture is then reacted at high temperature (e.g., the temperature ranges presented above for first process).

The oxides employed in positive electrodes of this invention preferably have average particle diameters of not greater than about 50 $\mu$m, and more preferably between about 1 and 20 $\mu$m. If necessary, the oxide materials may be ground and sieved, as with a hammer mill, ball mill, or attritive mill, to achieve the desired particle sizes. Often it will be enough to simply remove the particles that are larger than the upper the end of the desired range. Positive electrodes may be prepared from the positive electrode materials by any suitable method. In preferred embodiments, the positive electrode material components are first mixed, if used in a composite electrode, and then combined with one or more of the following additives: a binder, an electronic conductor, an additive to prevent corrosion of cell metal components and a material to control the acidity or basicity of the electrolyte. Suitable binders are substantially unreactive and insoluble in a cell's electrolyte at the voltages which the positive electrode experiences within the cell. Such binders include polyvinylidene difluoride ("PVDF"), polytetrafluoroethylene ("PTFE"), and ethylene propylene diene monomer ("EDPM"). Suitable electronic conductors include carbon and electronically conducting polymers. In a preferred embodiment the electronic conductor is a mixture of graphitic and non-graphitic carbons having in the range of about 95 to 50 wt % graphite, and more preferably in the range of about 65 to 80 wt % graphite. Suitable corrosion preventing additives include aluminum oxide. And suitable buffers include lithium carbonate. The above described positive electrode components can be formed into a positive electrode by various techniques. In especially preferred embodiments, the binder is provided in a solvent. By way of example, suitable solvents include cyclohexane with ethylene propylene diene monomer (EPDM), dimethyl formamide (DMF) or dimethyl acetamide (DMA) with polyvinylidene difluoride (PVDF), and a water dispersion of polytetrafluoroethylene (e.g., TEFLON® 35 or TEFLON® 60 available from DuPont Corporation, Wilmington, Del.). Initially, all solid components of the cell—including lithium metal oxide(s), electronic conductors, etc.—are mixed. Next, they are formed in a slurry using a solution of the binder. In one relatively simple process, the positive electrode slurry is applied to a metal support which acts as a current collector for the completed electrode. Preferably, the slurry is first applied as a thin film onto a metal foil substrate (the current collector), the solvent of the slurry is then evaporated, the temperature of the composite is then heated to the melting point of the polymer binder, allowed to cool, and finally the composite is compressed onto the foil (e.g., by using a compression roller). The resulting structure is then simply sized for use in an electrochemical cell, and optionally preprocessed in another manner to provide the desired physical-chemical properties of an electrode. Such procedures are well known to those in the skill of the art.

In a further preferred embodiment, the positive electrode is reheated after the compression step to allow the polymer binder to melt a second time. The composite may then compressed onto the foil a second time (e.g., by using a compression roller). This gives the finished electrode which may cut into sizes necessary for testing or cell assembly.

Various current collectors may be employed with the electrodes of the present invention. Preferably, the current collector is a metal foil, metal screen, or an expanded metal screen (e.g., "Exmet"™). If the current collector is a foil, adhesion of the composite positive electrode mixture to the current collector may be enhanced by roughening the current collector's surface. Suitable methods of roughening the surface include mechanical roughening (e.g., with steel wool), chemical etching, and electrochemically etching, as are all known in the art.

4. Cells Containing Composite Positive Electrodes

After the positive electrode has been prepared, it is assembled in a lithium intercalation cell. Typically, the cell will include (1) a cell container, (2) a composite positive electrode prepared as described above, (3) an intercalation negative electrode capable of reversibly taking up lithium on charge and releasing lithium on discharge, (4) an electrolyte conductive to lithium ions, and (5) a separator between the negative electrode and positive electrode.

FIG. 1 shows a lithium ion cell 50 such as might employ positive electrodes of the present invention. The external surface of cell 50 includes a positive terminal 4, a negative terminal 58, and a cell can 60. A cell cap subassembly 2 is provided at the top of a cell can 60, and is electrically connected to the cell's positive electrode by conductive tab 30. The positive electrode together with the cell's negative electrode, separator, and electrolyte form a spiral roll 54. A spiral design includes a thin negative electrode sheet and a thin positive electrode sheet separated from one another by a thin separator sheet saturated with the electrolyte. The three sheets are wound together in a spiral. As shown, spiral 54 is provided within cell can 60, and is separated from cell cap subassembly 2 by an insulator 52. The negative electrode component of electrode spiral 54 is electrically connected to a negative terminal 58 by a negative terminal tab 56.

Conventional cell containers having venting capability may be used to fabricate cells from the positive electrodes of this invention. Those of skill in the art will recognize the required properties of a cell container. It should be sized to compactly hold the various cell components and should be made of materials that are impervious to and chemically resistant to the other cell components at operating cell potentials. Preferably, it will also include a cell cap subassembly designed to with an internal disconnect mechanism and a vent. Such subassemblies are described in U.S. Pat. No. 5,609,972, issued on Mar. 11, 1997, (U.S. Ser. No. 08/610,388) filed Mar. 4, 1996 and naming Kaschmitter et al. as inventors. That patent is incorporated herein by reference for all purposes.

The material used as the intercalation cell negative electrode should exhibit high capacity, good reversibility of lithium insertion, and a high average discharge voltage so as to achieve the largest possible energy of the cell. In addition, the material should exhibit a relatively low formation capacity. Such materials include, by way of example, graphitic carbons, non-graphitic carbons, and mixtures of graphitic and non-graphitic carbons. The latter are particularly preferred negative electrodes for use with this invention. They are described in some detail in PCT publication No. WO 96/24956 with a publication date of Aug. 15, 1996, entitled "NONAQUEOUS ELECTROLYTE SECONDARY BATTERY". Both applications name S. Mayer as inventor and are incorporated herein by reference for all purposes. Briefly, such composite negative electrodes include mixtures of homogeneous graphitic carbon particles, homogeneous non-graphitic carbon particles, and binders as necessary. Such electrodes can be formulated to have high capacities, low electrode potentials, and other desirable properties of graphite, and, at the same time, have discharge profiles in which the electrode potential varies significantly with the degree of intercalation. Thus, lithium ion cells employing such negative electrodes will perform well at high rates of discharge.

Preferred intercalation negative electrodes include at least about 25 mass percent homogeneous graphitic carbon particles, more preferably at least about 50 mass percent homogeneous graphitic carbon particles, and most preferably about 75 mass percent homogeneous graphitic carbon particles. Of course, the optimal ratios may vary quite a bit depending upon the carbon constituents of the mixture and the desired properties of the electrode. It is generally desirable that the mixture result in electrodes having a potential which varies significantly with state of charge (state of deintercalation). Preferably, the mixture should be chosen such that the resulting electrode has an open circuit potential of that varies by at least about 0.25 volts from a fully charged state in which the electrode is fully intercalated to a state of charge at about 90% deintercalation. For comparison, a pure graphite intercalation electrode generally varies by only about 180 mV during discharge.

The graphite used in this invention is preferably a high purity natural graphite or a synthetic graphite having a high degree or anisotropic particle structure similar to natural graphite and very good compressibility and electrical conductivity. Suitable graphite includes, for example, SFG synthetic Graphites from Lonza Inc. of Fairlawn, N.J., Graphite KS (a round shaped particle) from Lonza, Graphite T (having a flake-shaped particle with higher surface area) also from Lonza, and grade B6-35 or 9035 from Superior Graphite Co. of Chicago, Ill. Non-graphitic carbons of widely ranging properties may be employed in this invention. In general, the non-graphitic carbons should provide intercalation electrodes having sloping deintercalation profiles. Further, the non-graphitic carbons preferably have a highly anisotropic particle structure (e.g., fibrous or plate-shaped) and high actual density (e.g., greater than about 2.1 gm/cc).

By providing both graphite and non-graphitic carbons having anisotropic particle morphologies, a rather high packing density can be obtained, thereby providing a high energy density.

An organic electrolyte for use in the cell may include any of various acceptable solvents and salts. Suitable organic electrolyte solvents for use in intercalation cells include one or more of the following: propylene carbonate, ethylene carbonate, 1,2-dimethoxyethane, 1,2-diethoxyethane, γ-butyrolactone, tetrahydrofuran, 2-methyltetrahydrofuran, 1,3-dioxolane, 4-methyl 1,3-dioxolane, diethyl ether, sulfolane, acetonitrile, propionitrile, dimethyl carbonate, diethyl carbonate, anisole, methyl propionate, ethyl propionate, methyl acetate, normal-propyl acetate, iso-propyl acetate, normal-butyl acetate, ethyl methyl carbonate, and mixtures or combinations thereof. Suitable electrolyte salts include one or more of the following: lithium bis-trifluoromethane sulfonimide or $LiN(SO_2CF_3)_2$ (available from 3M Corp. of Minn.), $LiN(SO_2C_2F_5)_2$ (also available from 3M Corp.), $LiAsF_6$, $LiPF_6$, $LiBF_4$, $LiB(C_6H_5)_4$, $LiCl$, $LiBr$, $CH_3SO_3Li$, and $CF_3SO_3Li$. In a preferred embodiment, the electrolyte solvent includes one of the following mixtures: (1) ethylene carbonate, dimethyl carbonate, and diethyl carbonate; (2) ethylene carbonate, ethyl methyl carbonate, and dimethyl carbonate; (3) ethylene carbonate, ethyl methyl carbonate, and diethyl carbonate; and (4) ethylene carbonate, ethyl methyl carbonate, diethyl carbonate, and dimethyl carbonate. In a particularly preferred embodiment, the electrolyte includes between about 0.8 and 1.4 M $LiPF_6$ and one of the four above mentioned solvent mixtures. The total concentration of $LiPF_6$ should not exceed the solubility limit of lithium in the solvent.. Thus, the total concentrations of this salt as well as other will generally be maintained below about 1.5 M.

Various separators known and widely-used in the art may be employed in the cells of this invention. Two particularly preferred separator materials are Celgard® 2300 and Celgard 2400 available from Celgard LLC of Charlotte, N.C. These materials are thin and inert and resist puncture. It should be noted that the Celgard 2300 becomes non-conductive at temperatures above about 120° C., thereby improving cell safety in response to possible cell internal short circuits which might be caused by puncture, crushing, etc.

5. Examples

Example 1

Synthesis of $LiNiO_2$ $LiNiO_2$ was prepared by combining 1.05 moles of vacuum dried $LiNO_3$ powder (100° C., 4 hours) with 1.0 mole of NiO (i.e. a 5% lithium molar excess, 1.05/1.00 Li/Ni, was used). A good mix of the reactants was obtained by continuously rotating a plastic container containing the chemicals and some stainless steel balls on a machine at about 60 rpm for 1 hour. The resulting mixture was compressed into pellets in a press at 4500 lb/in$^2$. The pellets then were placed into an alumina crucible, and heated in a retort furnace I) first under a flowing argon atmosphere at 400° C. for 4 hours (to safely remove $NO_2$ and other gaseous products), followed by II) heating under a flowing oxygen atmosphere at 750° C. for 16 hours. The reacted pellets were then crushed, ground, and sieved to less than 63 μm, following by a washing with deionized water and vacuum drying the powder (to remove any remaining water soluble reactants or unwanted products). Next, the powder was compressed into a pellet at 4500 lb/in$^2$, and heated a second time under flowing oxygen at 750° C. for 16 hours. The product was crushed, ground, and sieved to less than 32 μm. The regrinding and reheating process was performed to insure complete reaction of the reactants to form the product.

Example 2

Synthesis of $LiNi_{0.75}Al_{0.25}O_2$

The method of manufacturing $LiNi_{0.75}Al_{0.25}O_2$ cathode powder was essentially the same as that of example 1, except that a molar ratio of 75/25 of Ni/Al was used from NiO and $Al(OH)_3$ reactants in place of 100% NiO.

Example 3

Synthesis of $LiNi_{0.81}Co_{0.19}O_2$

The method of manufacturing $LiNi_{0.81}Co_{0.19}O_2$ cathode powder was essentially the same as that of example 1, except that a molar ratio of 81/19 of Ni/Co was used from NiO and $CO_2O_3$ reactants in place of 100% NiO.

Example 4

Synthesis of $LiNi_{0.66}CO_{0.14}Al_{0.20}O_2$

The method of manufacturing $LiNi_{0.66}CO_{0.14}Al_{0.20}O_2$ cathode powder was essentially the same as that of example 1, except that a molar ratio of 66/14/20 of Ni/Co/Al was used from NiO, $CO_2O_3$, and $Al(OH)_3$ reactants in place of 100% NiO.

Example 5

Synthesis of $LiMn_2O_4$ $LiMn_2O_4$ as prepared by combining 0.25 mole of vacuum dried $Li_2CO_3$ powder (100° C., 4 hours) with one mole of battery grade $MnO_2$ (Aldrich Chemicals). This resulted in theoretical stoichiometric Li/Mn composition of 1.00/2.00. A good mix of the reactants was obtained by continuously rotating a plastic container containing the chemicals and some stainless steel balls on a machine at about 60 rpm for 1 hour. The resulting mixture was compressed into pellets in a press at 4500 lb/in². The pellets were placed into an alumina crucible, and heated first under a stagnant air at 675° C. for 24 hours. The reacted pellets were then crushed, ground, and sieved to less than 63 $\mu$m. Next, the powder was compressed into a pellet at 4500 lb/in², and heated a second time in air at 675° C. for 16 hours. The product was crushed, ground, and sieved to less than 32 $\mu$m. The regrinding and reheating process was performed to insure complete reaction of the reactants to form the product.

Example 6

Synthesis of $Li_{1.05}MnO_4$

The method of manufacturing $Li_{1.05}Mn_2O_4$ was essentially the same as that of example 6, except that a molar ratio of 1.05/2.00 Li/Mn for the reactants was used.

Example 7

Synthesis of $LiMn_{1.995}CR_{0.005}O_4$

The method of manufacturing $LiMn_{1.995}CR_{0.005}O_4$ was essentially the same as that of example 6, except that a molar ratio of 0.005/1.995 Cr/Mn was used in place of Mn. Chromium metal powder (3 $\mu$average particle size) was used as a reactant source of chromium.

Manufacture of Electrodes for Electrochemical Cell

While several combinations of cathode materials, polymer binders, and solvents can be used to fabricate electrodes in this invention, all examples described below used a cathode prepared generally as follows. First, a binder solution, containing 10 gm of PVDF powder (Alt Atochem, Philadelphia, Pa.) in 100 cc of Dimethylformamide (DMF, DuPont Corp., Wilmington, Del.) was made by mixing the powder and solvent while heating the materials at 50° C. until the polymer was dissolved. Next, 50 g of cathode oxide (either pure or a mixture as in the composite cathodes of this invention) was combined with 5.40 g of SFG-15 grade graphite (Lonza Corp, Fairlawn, N.J.), and 2.10 g of carbon black (grade Vulcan XC-72R, Cabot Corp., of Billerica, Mass.) in a 250 cc polyethylene container. Next, 32.6 g of the binder solution was added to the solids. Finally, approximately 16.55 g of additional DMF was added to the mixture. Next stainless steel balls were added to the container, the container was sealed, and spun at about 60 rpm for four hours, at which point a uniform slurry "paint" was obtained. A 150 $\mu$m thick layer of paint was coated onto a 25 $\mu$m thick aluminum foil using a reverse-roll laboratory scale coating apparatus. The apparatus included a drier region where the DMF solvent was removed from the paint, leaving the cathode active material, carbon conductive agents, and binder on the film. Next, the film was compressed by running the film between a set of hardened steel rollers. A final film thickness of about 100 $\mu$m was obtained after compression.

Coin shaped type test cells were constructed by first accurately cutting out circular shaped samples (with a stamping tool) of cathode electrodes produced as above, and lithium metal foil (175 $\mu$m thick, for a negative electrode). In each case, the amount of electrode coating in the sample (and thereby the amount of active material) was determined by weighting the sample on a microbalance, and then subtracting the weight of the aluminum foil determined by removing the cathode film from three similar samples (removed by using DMF and a cotton swab, followed by cleaning with acetone), and finding the average weight of the foil. This careful procedure was necessary because the aluminum foil is thinned by a variable amount during the compression process. Next, lithium metal and separator were placed in the negative member of the coin cell (having an insulator gasket at its periphery), followed by the addition of a small amount of electrolyte (1.38 M $LiPF_6$ in 40/40/20 ethylene carbonate/dimethyl carbonate/diethyl carbonate by volume). Finally, the cathode was placed on top of the wetted separator, the positive can member was placed on top of the cathode, and the cell was closed using a crimping tool. The cell was placed in a test fixture wire connected to a computer controlled multichannel battery tester (Maccor Corporation, Tulsa Okla.).

Detailed Discussion of Experimental Results

All coin cell samples were charged to a maximum voltage of 4.2V for a total of 12 hours at a rate of which depended on the type of material (see below), followed by a discharge at the same rate to a minimum voltage of either 3.3V (for manganese containing samples) or 2.5V (for all others). Samples of $LiNiO_2$ and were charged at 22.5 mA/g (active material), $Li_xNi_yCo_zAl_nO_2$ samples and mixtures of $Li_xNi_y$-$Co_zO_2$ and $Li_xMn_{2-r}Ml_rO_4$ at 17.1 mA/g, and the pure $Li_xMn_{2-r}Ml_rO_4$ samples at 15 mA/g. The variable rate charging was used so that all materials were nominally discharged in 8 hours. Also, because discharging $Li_xMn_{2-r}Ml_rO_4$ below 3.3V was found to result in a rapid reduction in the capacity of the material at voltages above 3.3V (believed to be caused by the irreversibly transform of the spinnel $Li_xMn_{2-r}Ml_rO_4$ at x>1.0 to a $LiMnO_2$ like compound) the minimum voltage was set at that potential.

Figure 2:
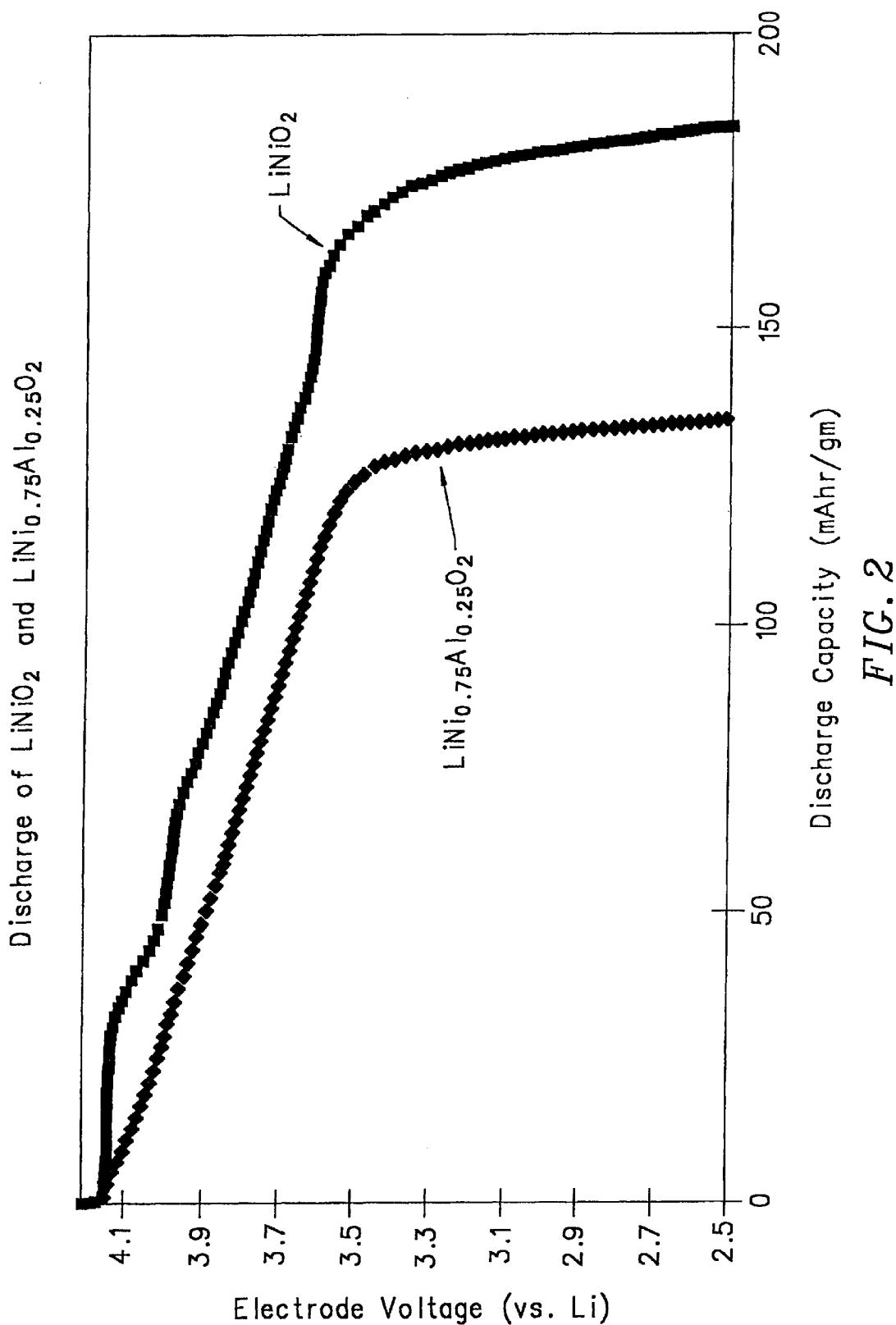
FIG. 2 is a graph providing two discharge curves: one for Lithium Nickel Oxide ($LiNiO_2$) and one for Lithium Nickel Aluminum Oxide ($LiNi_{0.75}Al_{0.25}O_2$), each discharged at approximately an 8 hour rate. The counter electrode was lithium metal. The material was first charged to a maximum voltage of 4.2V (vs. Li) for a total of 12 hours.

FIG. 2 shows the discharge curves of $LiNiO_2$ and $LiNi_{0.75}Al_{0.25}O_2$. While the voltage drop of the $LiNiO_2$ is significantly greater than that of either $LiCoO_2$ or $LiMn_2O_4$, the material shows at least three discharge plateaus at around 4.13, 4.00, and 3.60V, and a discharge capacity of approximately 185 mAhr/gm. The average discharge voltage of the aluminum substituted compound is slightly less than the Ni parent compound. In contrast the discharge capacity of $LiNi_{0.75}Al_{0.25}O_2$ is smaller (140 mAhr/gm), but progresses with a voltage decreasing at an approximately constant rate with state of charge. The loss of fine structure in the discharge curve is believed to be caused be the breakdown of symmetry of the parent compound $LiNiO_2$, as aluminum is randomly located into the nickel atoms normal sites of the layered compound. Because these plateaus are associated with various defined two dimensional energy states of lithium in the $LiNiO_2$ corresponding to a certain arrangement within the parent compound, substitution with aluminum destroys those defined Li/Ni state interaction, making the insertion of lithium occur in a more random material. Independent of the actual mechanism, the removal of the discharge plateaus from the voltage/capacity relationship can result in a substantial increase in the rate capability of the cathode, as described in PCT publication No. WO 96/14956, with a publication date of Aug. 15, 1996; M. Doyle et. al., J. Electrochem. Soc., Vol. 140, pg. 1523, 1993; and T. F. Fuller et al, J. Electrochem. Soc., Vol. 141, pg. 1, 1994 (incorporated herein by reference for all purposes).

Figure 3:
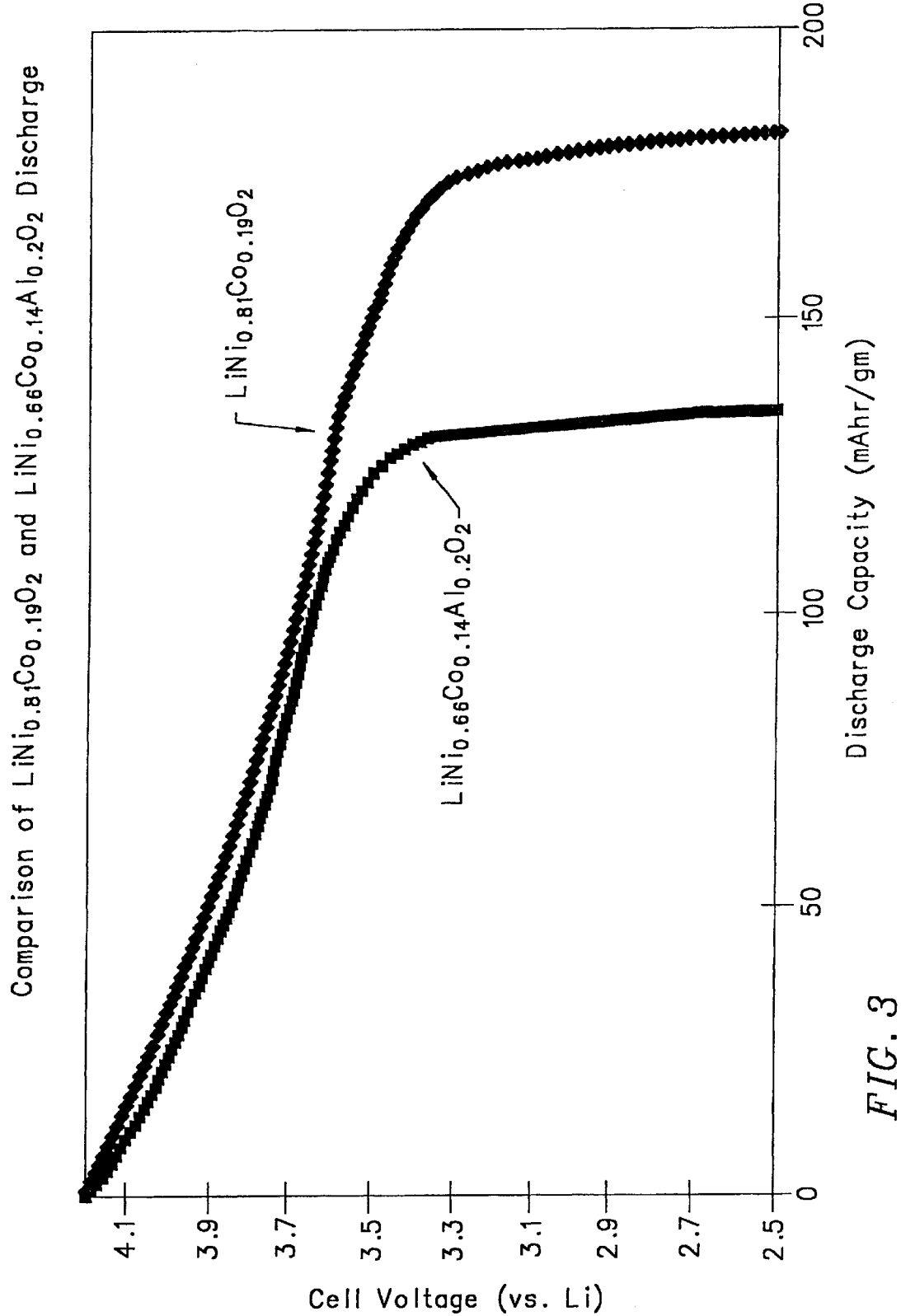
FIG. 3 is a graph providing two discharge curves: Lithium Nickel Cobalt Oxide ($LiNi_{0.81}Co_{0.19}O_2$) and Lithium Nickel Cobalt Aluminum Oxide ($LiNi_{0.66}Co_{0.14}Al_{0.20}O_2$), each discharged at approximately an 8 hour rate. The counter electrode was lithium metal. The material was first charged to a maximum voltage of 4.2V (vs. Li) for a total of 12 hours.

FIG. 3 compares the discharge behavior of $LiNi_{0.81}Co_{0.19}O_2$ and $LiNi_{0.66}Co_{0.14}Al_{0.20}O_2$. While both materials show no voltage plateaus during discharge and appear similar, unlike the case of the Ni parent compound material, the discharge capacity of the aluminum substituted compound is smaller (140 mAhr/gm vs. 180 mAhr/gm). However, in this case the substitution of aluminum for Ni/Co results in no change in average discharge (apparently because $LiNi_{0.81}Co_{0.19}O_2$ has a slight amount of capacity at a slightly lower voltage than $LiNi_{0.66}Co_{0.14}Al_{0.20}O_2$)

Figure 4:
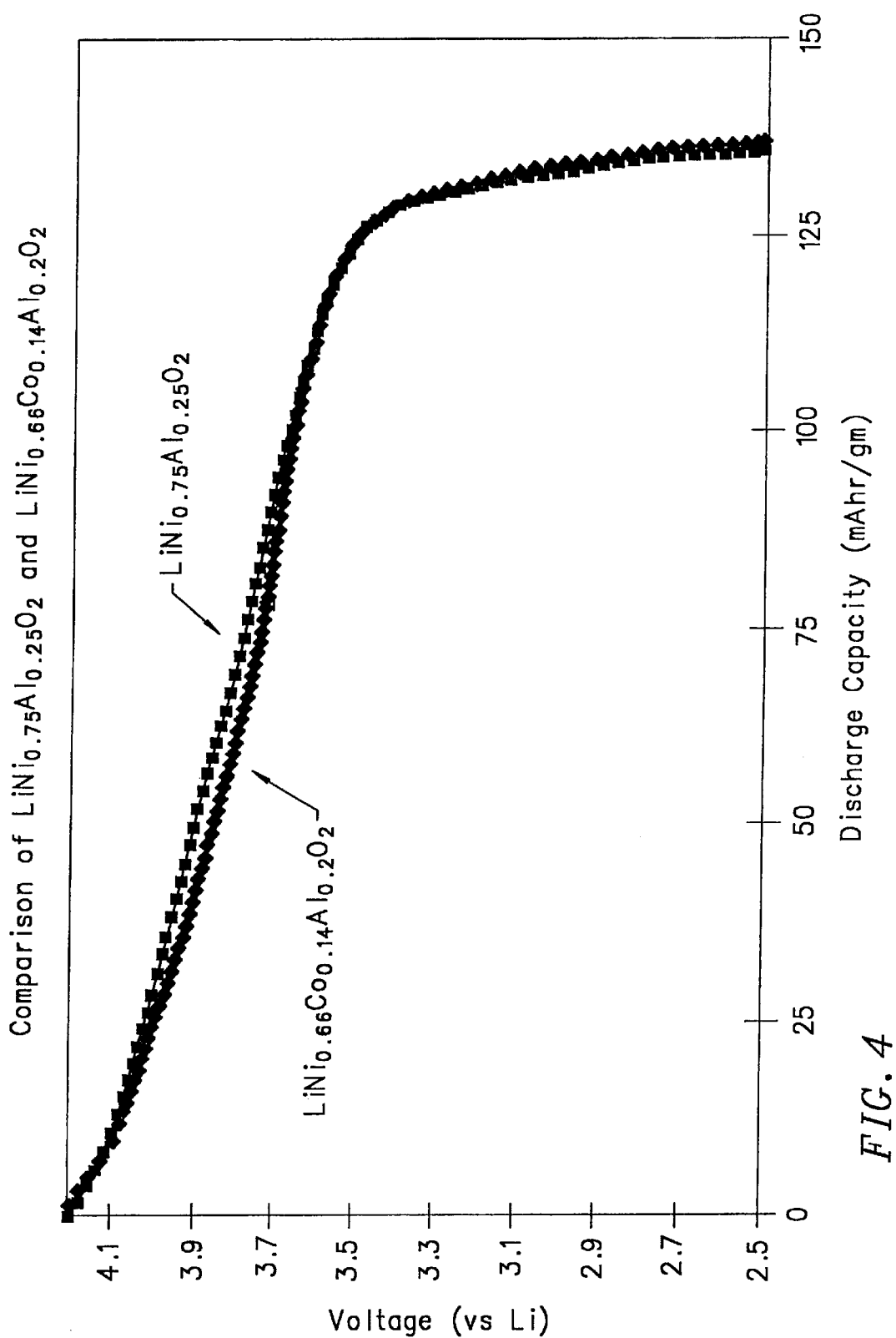
FIG. 4 is a graph providing two discharge curves: Lithium Nickel Aluminum Oxide ($LiNi_{0.75}Al_{0.25}O_2$) and Lithium Nickel Cobalt Aluminum Oxide ($LiNi_{0.66}CO_{0.14}Al_{0.20}O_2$), each discharged at approximately an 8 hour rate. The counter electrode was lithium metal. The material was first charged to a maximum voltage of 4.2V (vs. Li) for a total of 12 hours.

FIG. 4 shows the data presented in FIGS. 2 and 3 for $LiNi_{0.75}Al_{0.25}O_2$ and $LiNi_{0.66}Co_{0.14}Al_{0.2}O_2$, plotted together for easy comparison. The two materials discharge curves are very similar in average discharge voltage, slope of the discharge curve, and discharge capacity (about 140 mAhr/gm).

Figure 5:
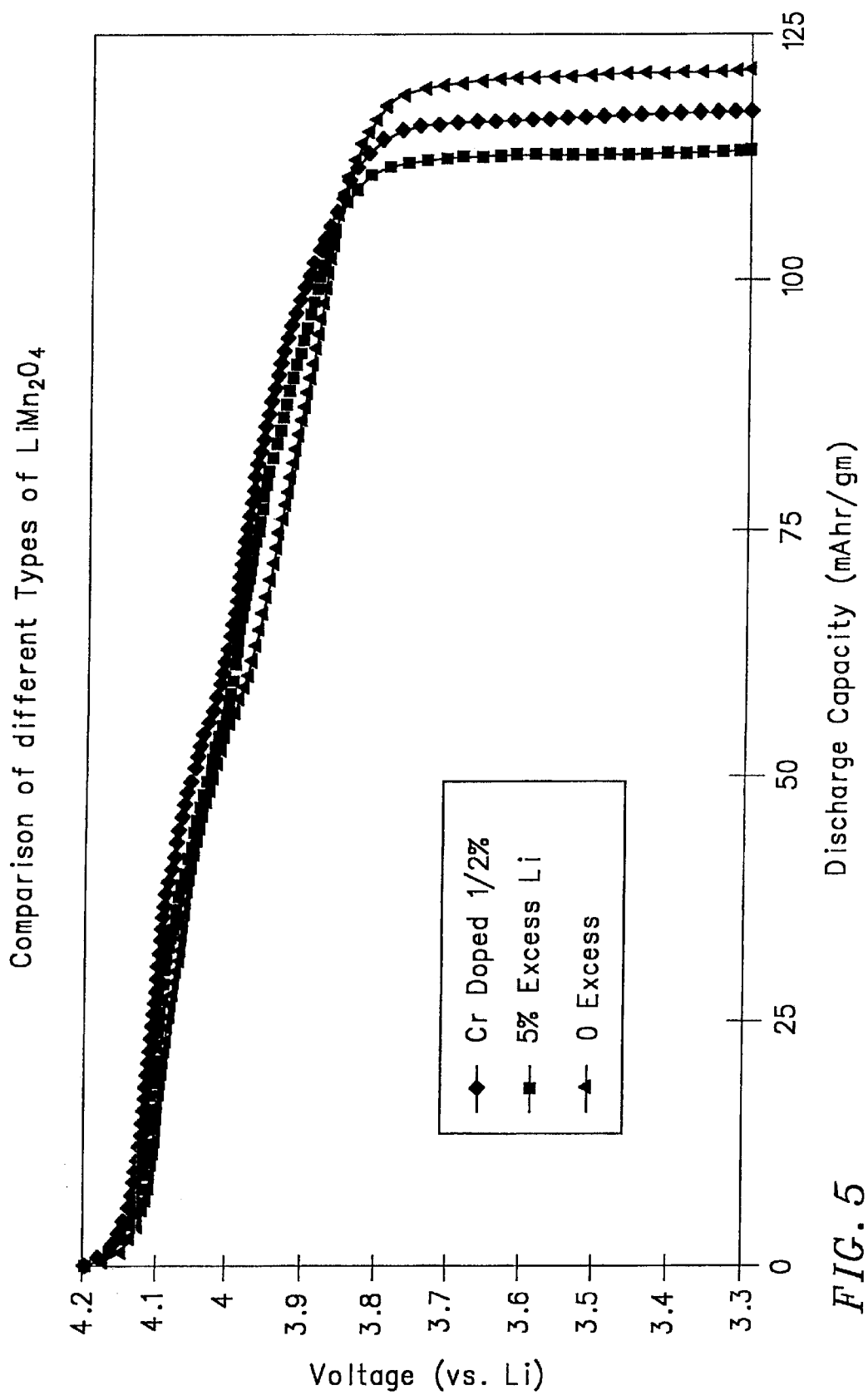
FIG. 5 is a graph providing discharge curves for Lithium Manganese Oxide (spinel) of three types: $LiMn_2O_4$ (stoichiometric), $LiMn_{1.05}Mn_2O_4$ (derived from excess lithium) and $LiMn_{1.995}Cr_{0.005}O_2$ (chromium doped). The discharge rate was approximately 8 hour rate. The counter electrode was lithium metal. The material was first charged to a maximum voltage of 4.2V (vs. Li) for a total of 12 hours.

In FIG. 5, several different types of $Li_{1+y}Mn_{2-r}Ml_rO_4$ are compared. The parent compound $LiMn_2O_4$, has more defined and flat voltage plateaus (observed at 4.10 and 3.95V), as well as a higher first discharge capacity (120 mAhr/gm) than the doped materials $Li_{1.05}Mn_2O_4$ and $LiMn_{1.995}Cr_{0.005}O_4$ (about 110 and 115 mAhr/gm respectively). However, as mentioned before, the undoped compound does not cycle well, while the addition of additives like Cr and excess Li improve the retention of capacity with cycle number.

Figure 6:
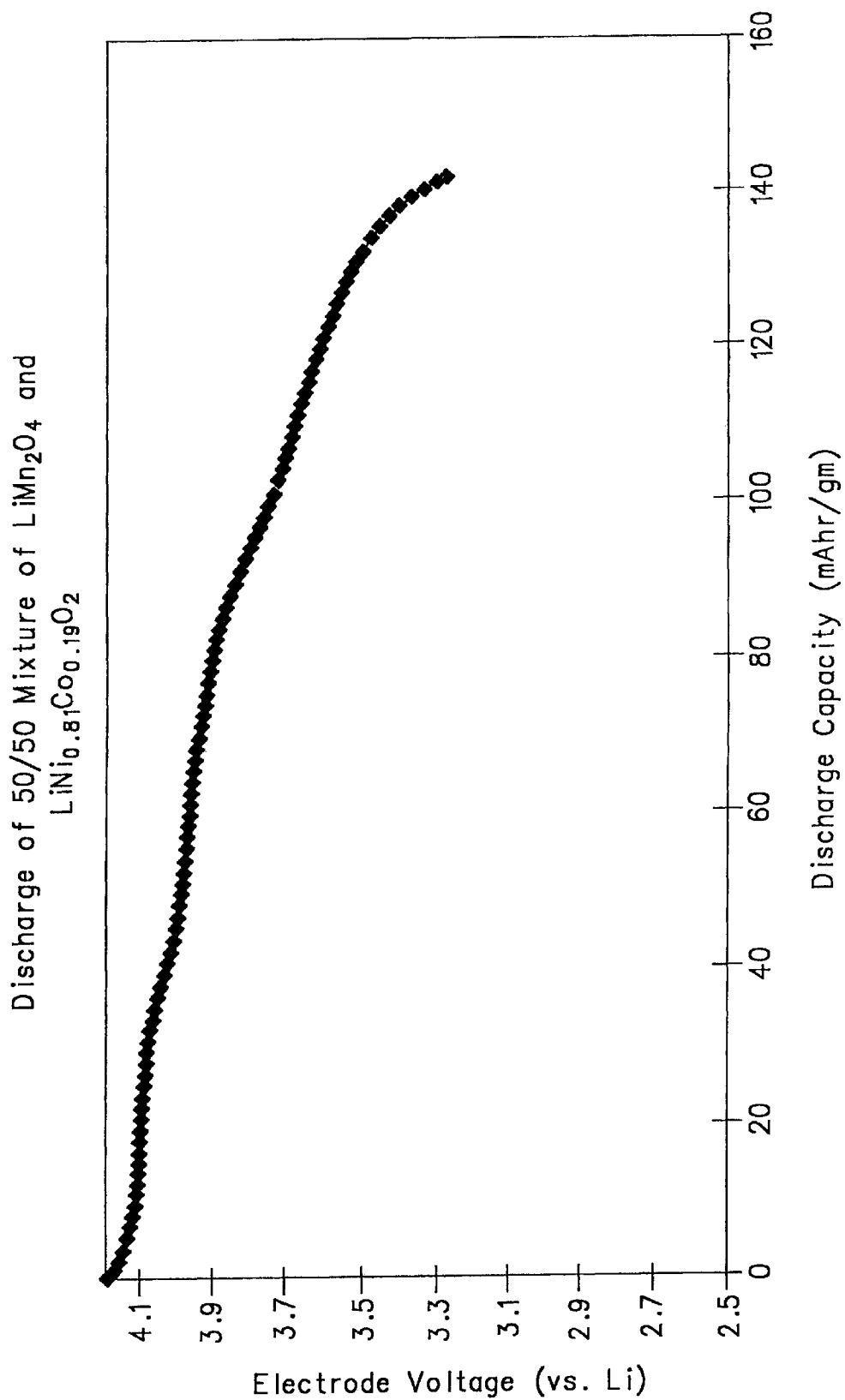
FIG. 6 is a discharge curve of 50/50 by weight physical mixture of Lithium Nickel Cobalt Oxide ($LiNi_{0.81}Co_{0.19}O_2$) and Lithium Manganese Oxide ($LiMn_2O_4$) discharged at approximately an 8 hour rate. The counter electrode is lithium metal. The material was first charged to a maximum voltage of 4.2V (vs. Li) for a total of 12 hours.

The discharge curve for a 50/50 wt mixture of $LiMn_2O_4$ and $LiNi_{0.81}Co_{0.19}O_2$ is shown in FIG. 6. The $LiMn_2O_4$ 4.10V and 3.95V plateaus are still evident, but are smoothed out by the presence of $LiNi_{0.81}Co_{0.19}O_2$. The discharge capacity is approximately the average of the two pure compound, 142 mAhr/gm, the slight difference probably attributable to the fact that $LiNi_{0.81}Co_{0.19}O_2$ has a slight amount of capacity below 3.3V vs. Li.

Figure 7:
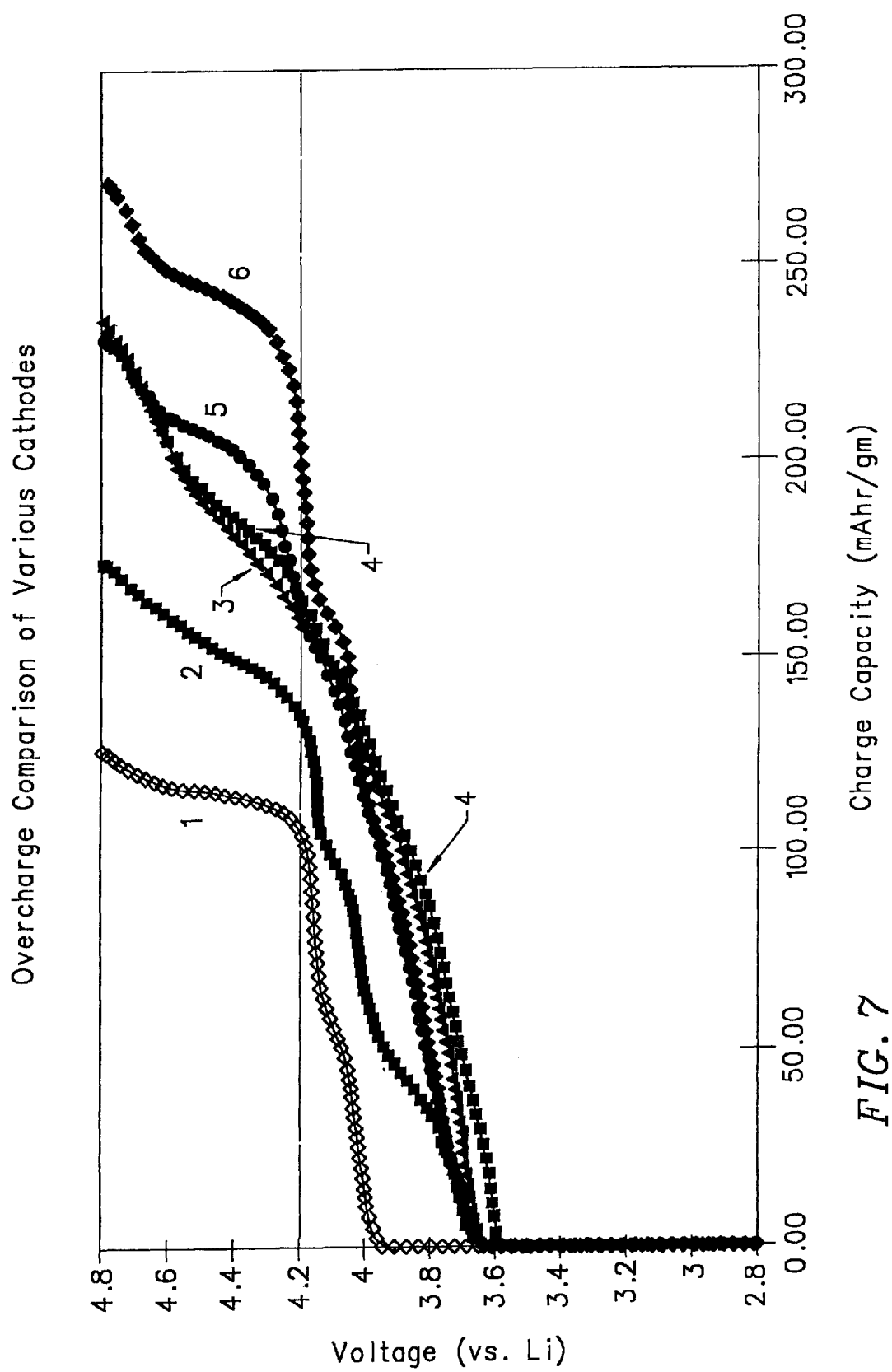
FIG. 7 is a graph presenting charge curves for a number of metal oxides. The materials were first charged to a maximum voltage of 4.2V (vs. Li) for a total of 12 hours, then discharged to 2.5V at approximately and 8 hour rate prior to recharging as shown. The rate of charge was such that that the time to reach 4.2V was approximately 8 hours in all examples. The materials were (1) $LiMn_{1.996}Cr_{0.005}O_2$, (2) a 50/50 by weight physical mixture of $LiMn_{1.996}Cr0.005O_2$ and $LiNi_{0.81}CO_{0.19}O_2$, (3) $LiNi_{0.66}Co_{0.14}Al_{0.20}O_2$, (4) $LiNi_{0.81}Co_{0.19}O_2$, (5) $LiNi_{0.75}Al_{0.25}O_2$ and (6. $LiNiO_2$.
Figure 8:
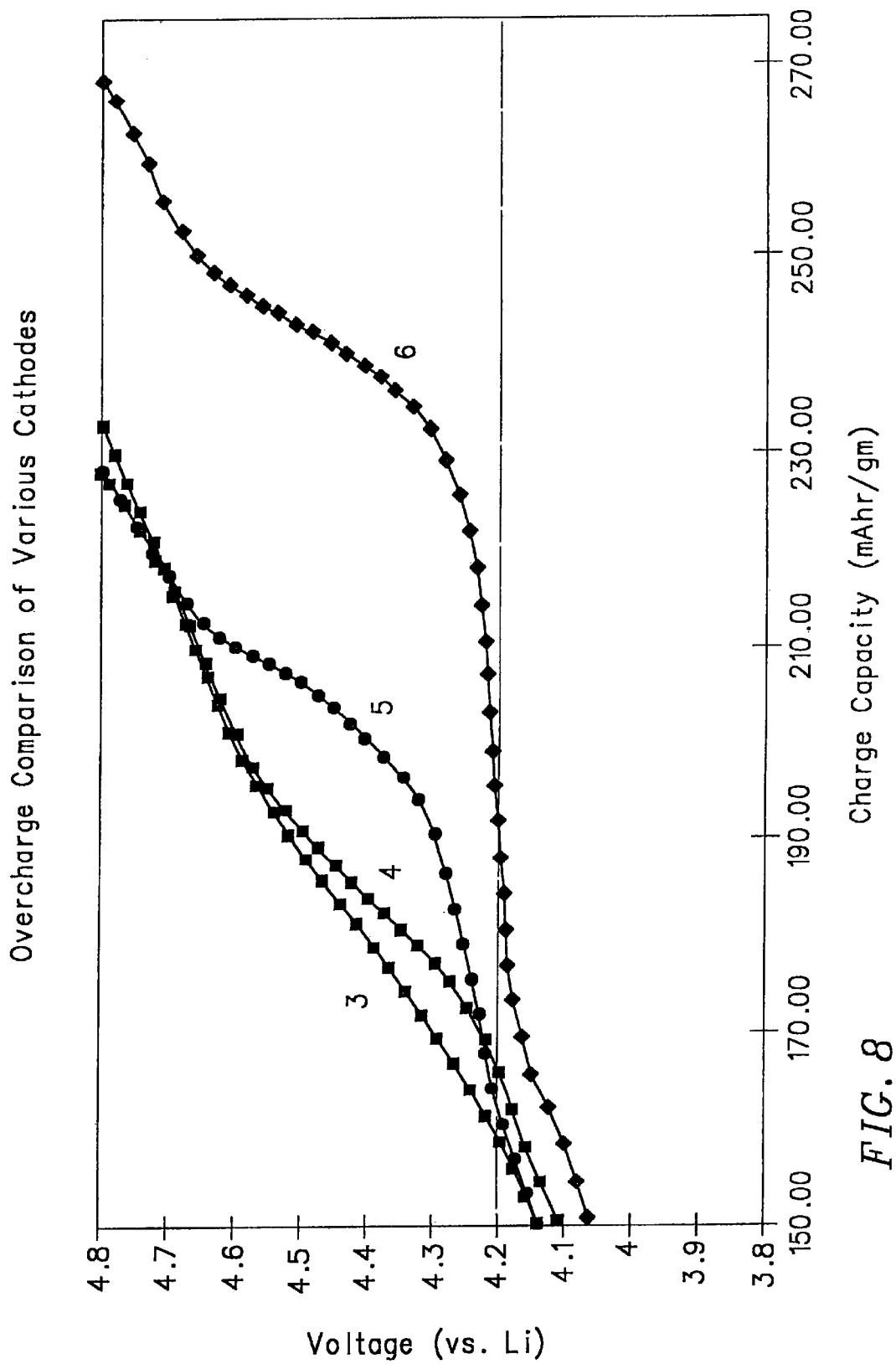
FIG. 8 is a graph of the data from FIG. 6, represented with an expanded scale to demonstrate the differences between materials 3,4,5, and 6 at high voltages.

FIG. 7 shows the charge and overcharge (above 4.2V) of a number of cathode materials at a nominal rate of 8 hours to reach 4.2V. Curve 1 corresponds to a $Li_{1.005}Mn_{1.995}Cr_{0.05}O_2$ electrode. Note that there is very little capacity above the normal charge voltage, and a slight shoulder around 4.6V. It is believed that the apparent capacity above 4.6 is likely associated with the decomposition of the electrolyte, and doesn't correspond to any lithium removal from $Li_{1.005}Mn_{1.995}Cr_{0.05}O_2$. It is clear from this figure that errors in charging $Li_{1.005}Mn_{1.995}Cr_{0.05}O_2$ (as might result from variation in charger performance) will not result in any significant removal of further lithium from the host, though undercharging (e.g. at 4.15V) can cause significant under-utilization of the material. Curve 4 in both FIGS. 7 and 8 is the overcharge data for a $LiNi_{0.81}Co_{0.19}O_2$ electrode. The capacity to 4.2V is somewhat greater than $Li_{1.005}Mn_{1.995}Cr_{0.05}O_2$ (170 mAhr/g, vs. 110 mAhr/g), and capacity continues to be drawn from the material above that potential, though at a decreasing rate. Again, at around 4.6V, the apparent capacity increases as electrolyte decomposition begins. Curve 2 is a 50/50 mixture of the $Li_{1.005}Mn_{1.995}Cr_{0.05}O_2$ and $LiNi_{0.81}Co_{0.19}O_2$. The capacity and shape of the curve is approximately an average of the two materials. The slope of the charge curve at about 4.2V is quite sharp, indicating little capacity available beyond that potential. Curve 6 is an overcharge curve for $LiNiO_2$. This material exhibits an extremely large capacity (180 mAhr/g). Also, the capacity removed at potentials slightly above 4.2V is very large (an additional 60 mAhr/g between 4.2 and 4.3V), as the oxidation state of the material increases dramatically with voltage. 86% of the original lithium is removed at 4.3V. At higher states of charge the potential increases rapidly to 4.6V at which point electrolyte decomposition is evident. The total capacity removed at 4.6V corresponds to 92% of the original lithium in the compound. Curve 5 of FIGS. 7 and 8 corresponds to the overcharge of a $LiNi_{0.75}Al_{0.25}$ electrode. The capacity at 4.2V is less than the parent compound (about 165 mAhr/gm) but exhibits a similar significant additional capacity removal up to 4.3V (30 mAhr/g). While the slope of the charge curve is not as flat as that of $LiNiO_2$ around 4.2V, the slope is significantly greater than curve 3 or 4 ($LiNi_{0.66}CO_{0.14}Al_{0.20}O_2$ and $LiNi_{0.8}CO_{0.19}O_2$), as can be see FIG. 8. The capacity removed corresponds to 64% at 4.3V, and 71% at 4.6V. Finally curve 3 corresponds to a $LiNi_{0.66}Co_{0.}14Al_{0.20}O_2$ cathode. The slope of the curve is the much greater than that for either $LiNiO_2$ or $LiNi_{0.75}Al_{0.25}O_2$ between 4.2 and 4.3V. The amount of lithium removed at 4.3 and 4.6V corresponds to 59% and 69% respectively. Table 3 compares a number of important parameters derived from the data of FIGS. 7 and 8 and elsewhere.

TABLE 3

| Cathode Material | Molecular Weight (g/mole) | Theoretical Maximum Capacity (mAhr/g) | Reversible Capacity (4.2 V Charge, mAhr/g)[1] | Charge Capacity at 4.3 V (mAhr/g)[2] [Oxidation State] | Charge Capacity at 4.6 V [Oxidation State][2] |
|---|---|---|---|---|---|
| $LiNiO_2$ | 97.6 | 275 | 180 | 235 [3.85] | 250 [3.91] |
| $Li_{1.005}Mn_{1.995}Cr_{0.005}O_4$ | 180.4 | 147 | 110 | 114 [3.89] | 118 [3.90] |
| $LiNi_{0.81}Co_{0.19}O_2$ | 97.6 | 275 | 180 | 180 [3.65] | 200 [3.73] |
| 50/50 $LiNi_{0.81}Co_{0.19}O_2$/ $Li_{1.005}Mn_{1.995}Cr_{0.005}O_4$ | 139.0 (avg.) | 211 | 142 | 141 [NA] | 165 [NA] |
| $LiNi_{0.75}Al_{0.25}O_2$ | 89.7 | 299 | 132 | 191 [3.64] | 211 [3.71] |
| $LiNi_{0.66}Co_{0.14}Al_{0.20}O_2$ | 91.3 | 294 | 137 | 171 [3.58] | 202 [3.69] |
| $LiCoO_2$ | 97.8 | 274 | 140 | 155 [3.57] | 224 [3.82] |

[1]Cell fully charged at 4.2 V for 12 hours, followed by discharge at 8 hour rate
[2]Constant current charged at a rate corresponding to 8 hour discharge capacity above (i.e., not an equilibrium value)

FIGS. 9 through 14 are differential capacity curves derived from the data of FIG. 7. The differential capacity is the is the derivative of the charging curve, dC/dV, having units of mAhr/g/V. Peaks in the differential capacity correspond to plateaus in the capacity vs. voltage plot, and show at what potential large amounts of capacity changes are occurring. Conversely, materials with dC/dV curves which show little feature represent intercalation that is more uniform with potential.

Figure 9:
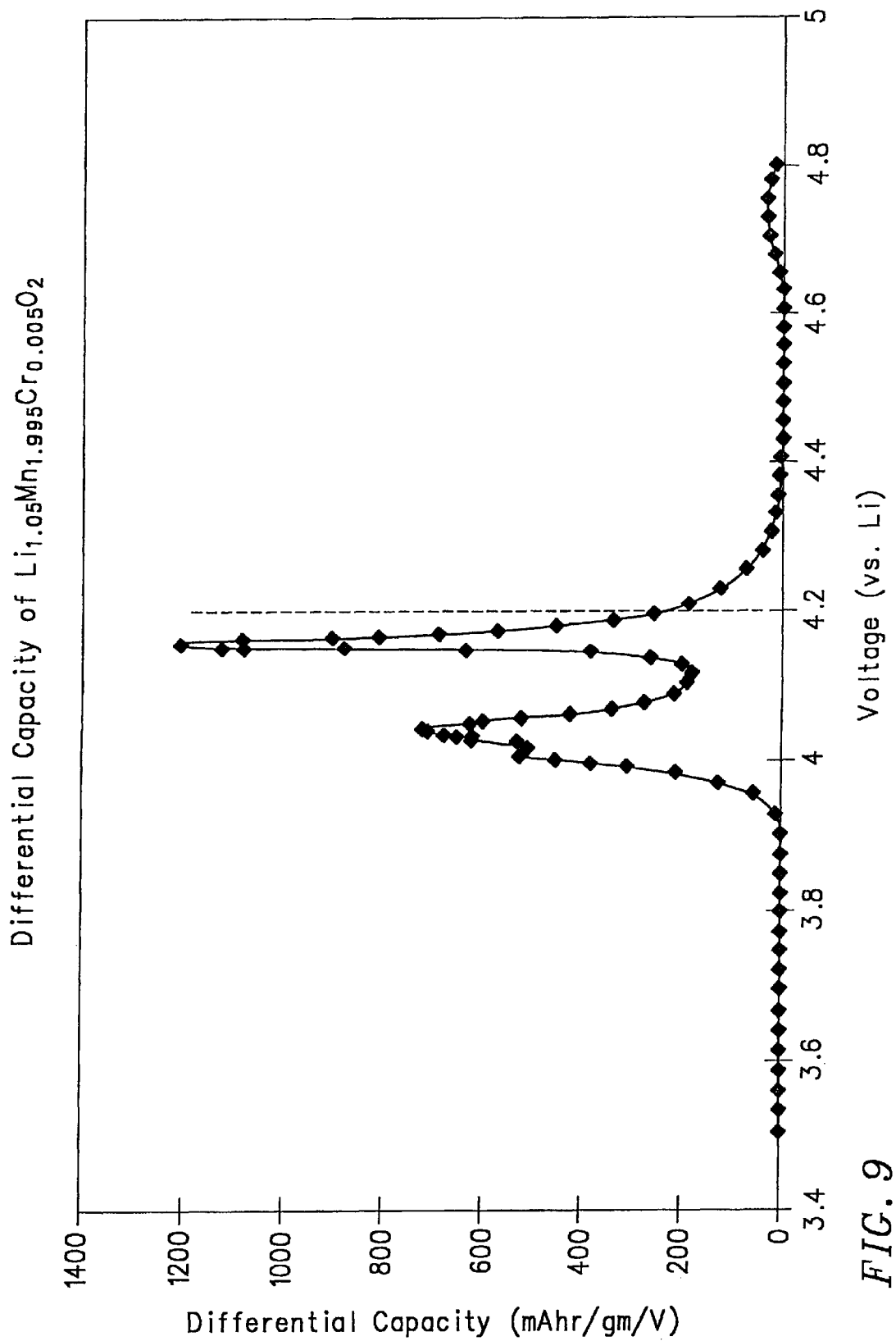
FIG. 9 is a graph showing the differential charging capacity (mAhr/gm/V) as a function of voltage (vs. Li) of $Li_{1.05}Mn_{1.995}Cr_{0.005}O_2$. The rate of charge was such that the time to reach 4.2V was approximately 8 hours.

FIG. 9 shows the differential capacity charging curve for $Li_{1.05}Mn_{1.995}Cr_{0.005}O_2$. As shown, there are two large peaks at 4.0V and 4.15V. The value of dC/dV is nearly zero above 4.3V, with the oxidation of electrolyte occurring above 4.6V.

Figure 10:
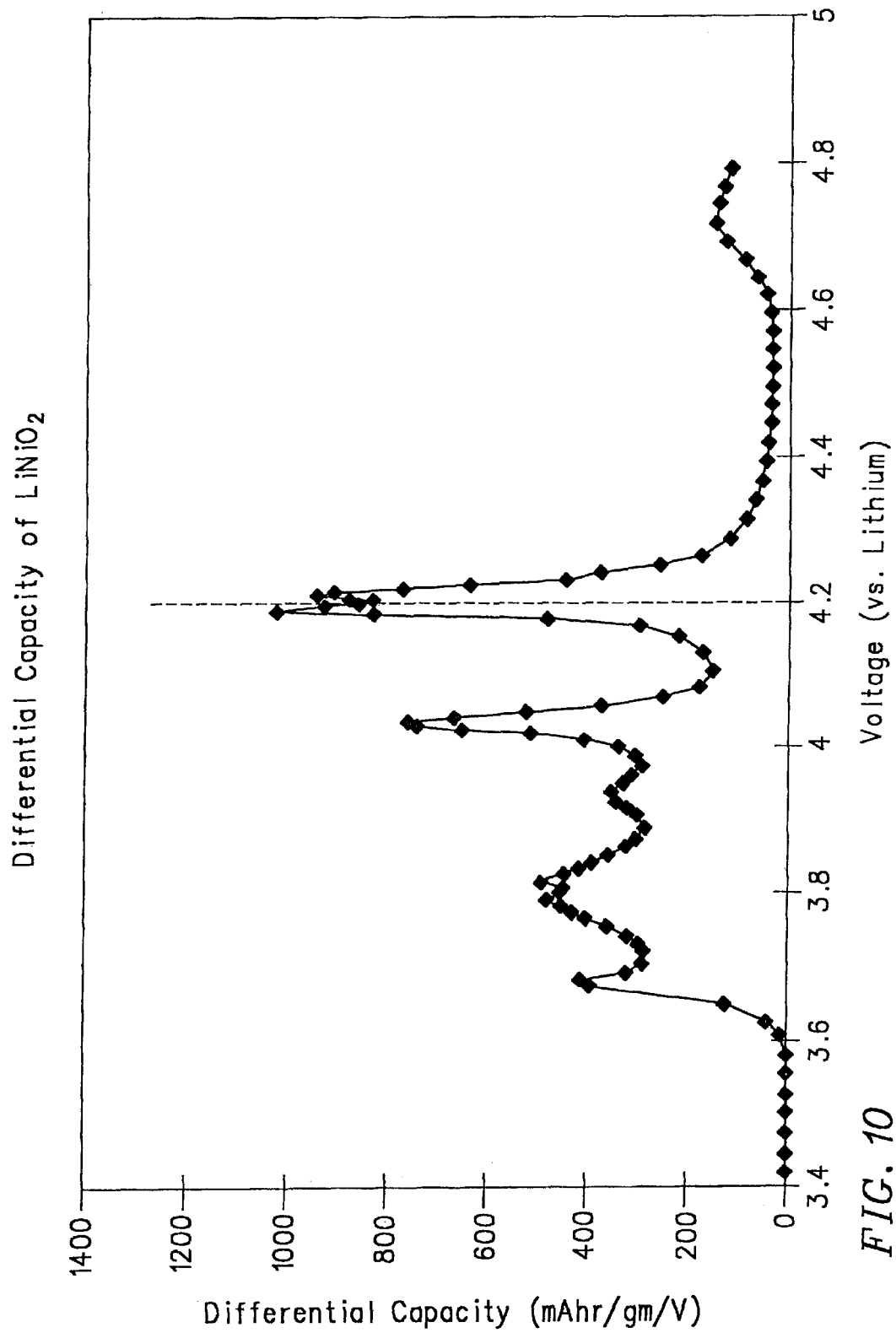
FIG. 10 is a graph showing the differential charging capacity as a function of voltage (vs. Li) of $LiNiO_2$. The rate of charge was such that the time to reach 4.2V was approximately 8 hours.

FIG. 10 is a similar plot for $LiNiO_2$. This figure exemplifies the problems that exist with the use of this material as a cathode. A large number of dC/dV peaks are evident at 3.7, 3.8, 3.9, 4.0 and 4.2 V. While little capacity is removed beyond 4.3 V, the oxidation state is very high at above 4.1V. Control of the oxidation state is difficult when charging at a potential in which a peak in the dC/dV curve occurs. Furthermore, small errors in charge voltage result in large changes in capacity. In a lithium-ion cell, this capacity must be absorbed by the carbon negative. Since the cell normally operates at as high a intercalation level as practical, it can not accommodate the additional lithium, and therefore lithium electroplating can occur. Electroplated lithium in the presence of a high oxidation state metal oxide cathode is a highly undesirable condition. Therefore, it is believed that $LiNiO_2$ is an unsafe material for use in lithium ion commercial applications. Some have suggested that by charging $LiNiO_2$ only to 4.1V, the oxidation state is lower and the material is safer. However, the capacity at and cell voltage is lower at 4.1V, and the safety problem is unchanged for a scenario in which the charger fails and the material is driven to a very high oxidation state.

Figure 11:
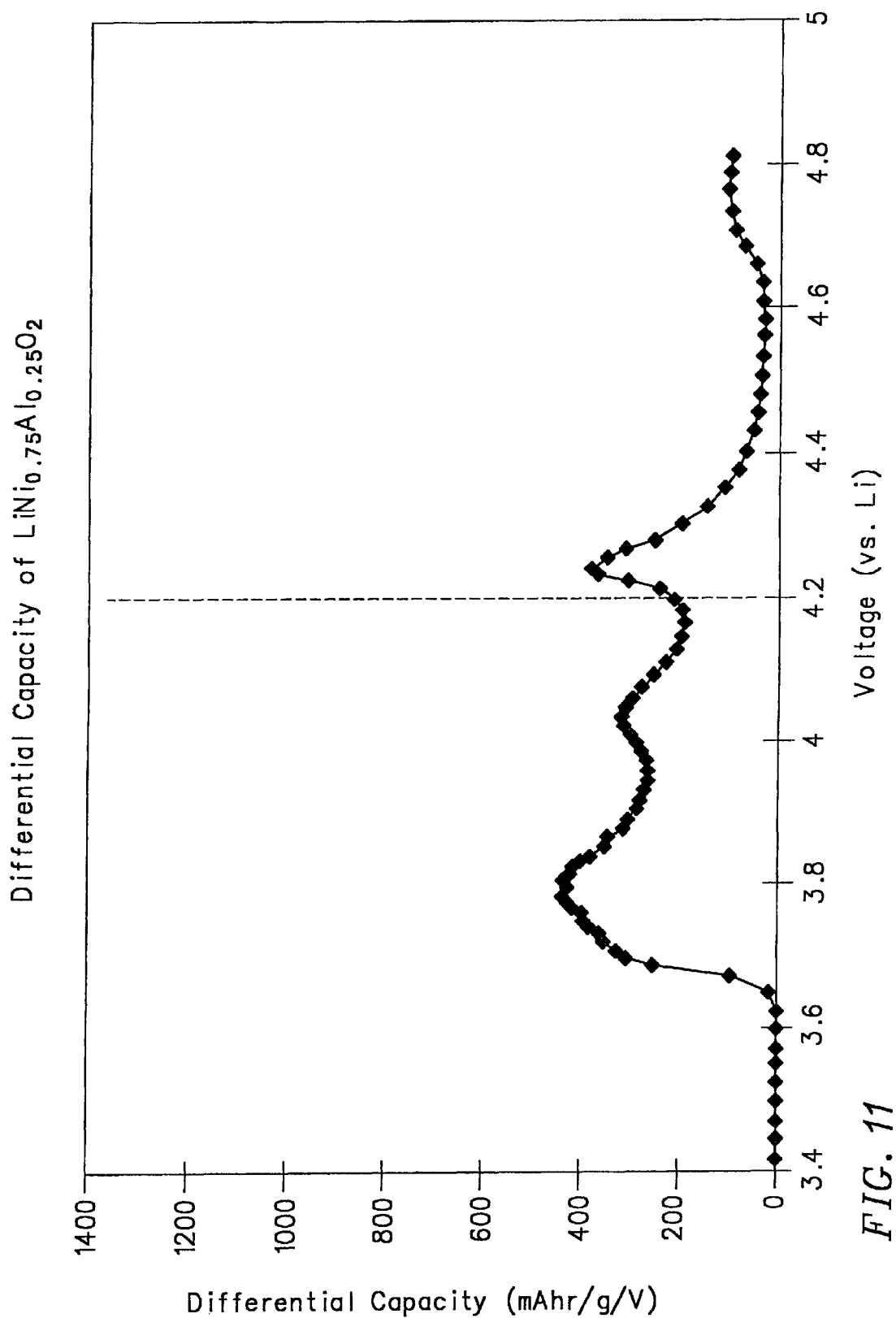
FIG. 11 is a graph showing the differential charging capacity as a function of voltage (vs. Li) of $LiNi_{0.75}Al_{0.25}O_2$. The rate of charge was such that the time to reach 4.2V was approximately 8 hours.

FIG. 11 shows the dC/dV curve for $LiNi_{0.75}Al_{0.2}O_2$. Smaller, broader peaks are observed compared to the parent compound $LiNiO_2$. The peak at 4.2V is about 40% smaller, and its center is shifted from 4.2 to 4.25V. The maximum oxidation state of this material is less than the parent, but is similar to that of the cobalt and aluminum-cobalt substituted compounds. However, as noted above, the oxidation state around the nominal charge voltage can still change significantly, as evident by the peak in FIG. 9 at 4.25V.

Figure 12:
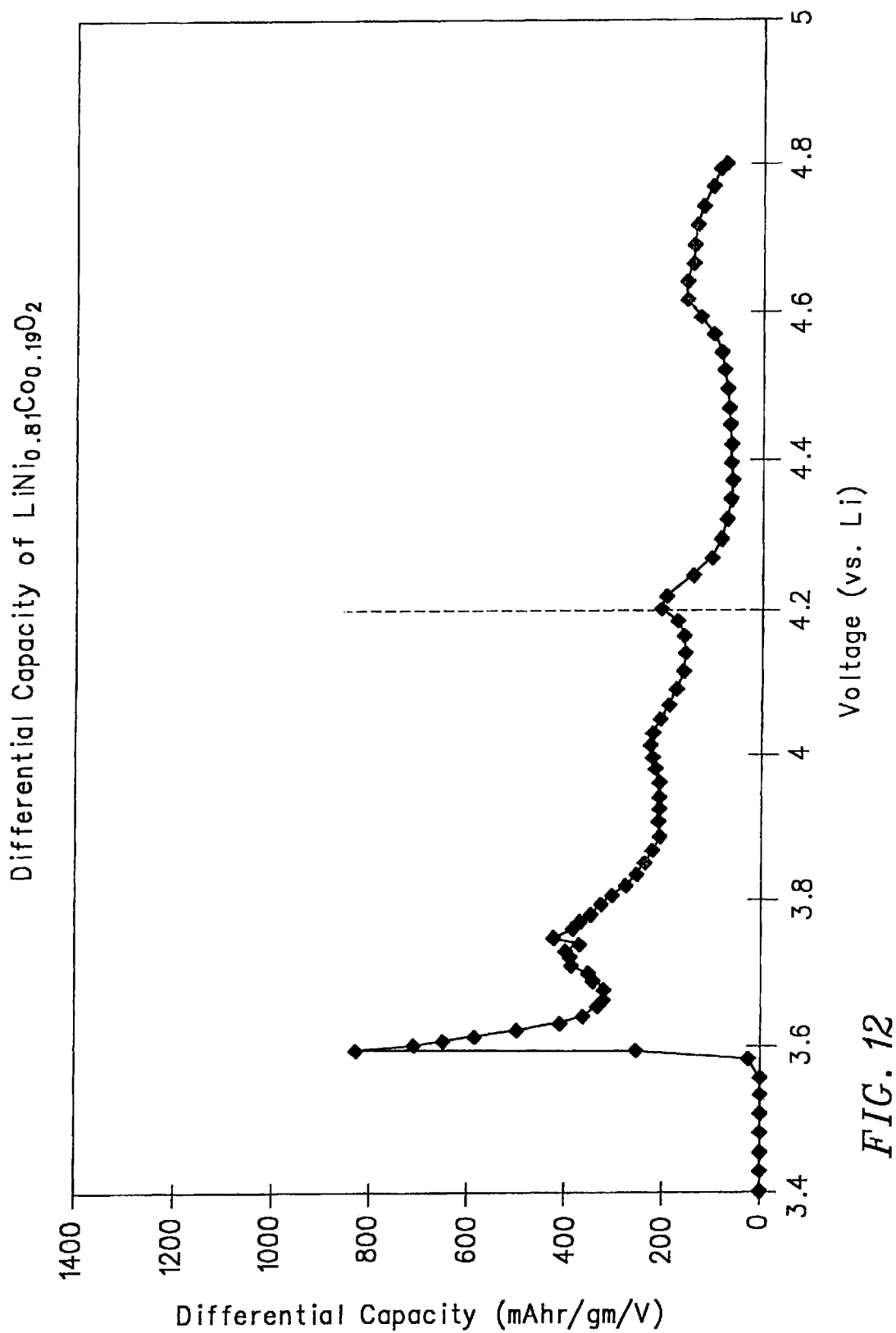
FIG. 12 is a graph showing the differential charging capacity as a function of voltage (vs. Li) of $LiNi_{0.81}Co_{0.19}O_2$. The rate of charge was such that the time to reach 4.2V was approximately 8 hours.

FIG. 12 shows the dC/dV curve for a $LiNi_{0.81}Co_{0.19}O_2$ cathode. A sharp initial peak at 3.6V appears which is not evident in the parent compound. Furthermore, all other peaks observed in the parent are greatly diminished. Most notably the peak at 4.2V is small (20% of the parent and one-half as small as the aluminum substituted compound). This material is better than either the nickel or nickel-aluminum compounds regarding capacity control at the standard charge voltage, but can still be unstable under other abusive conditions such as heating (due to external heating or a short circuit).

Figure 13:
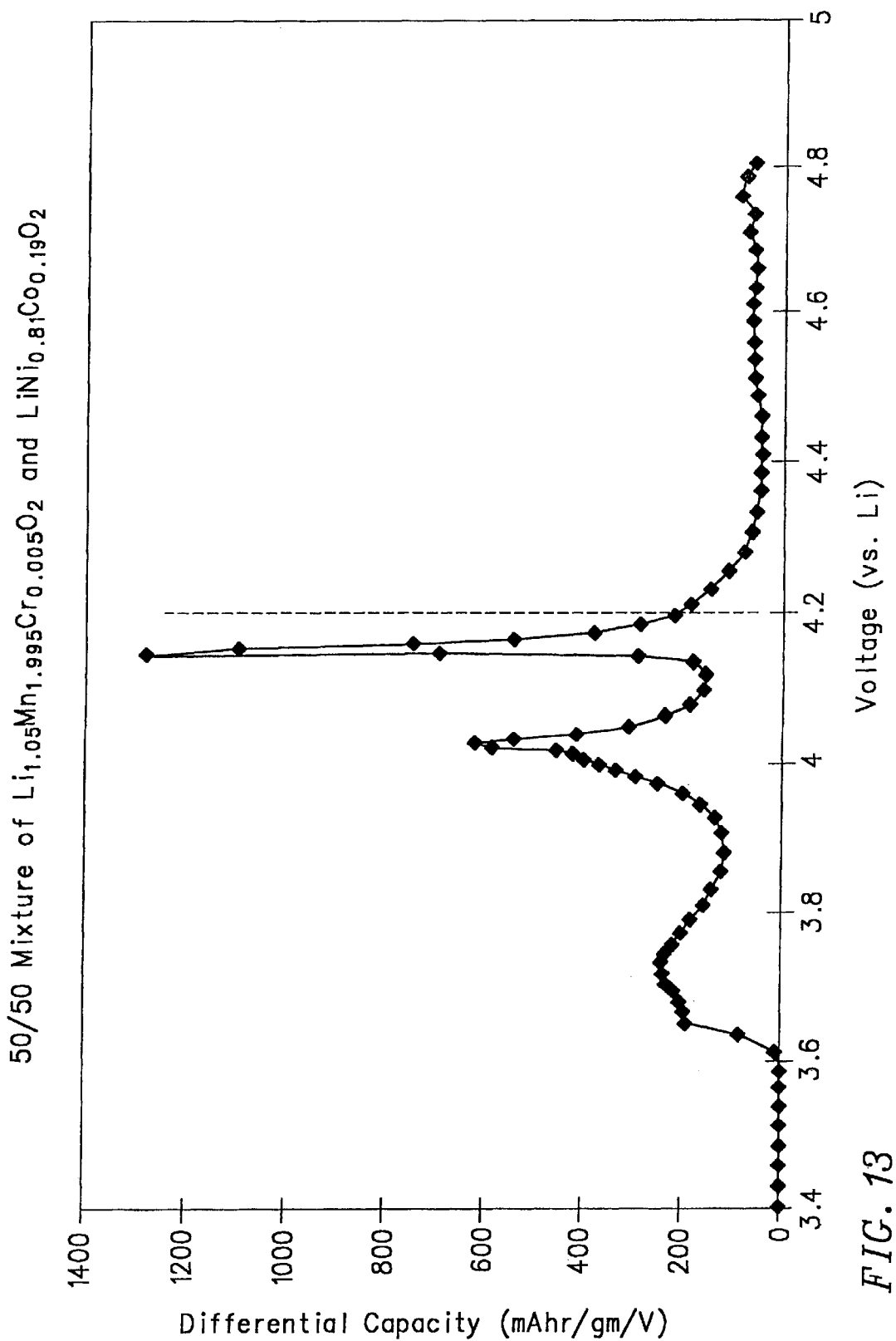
FIG. 13 is a graph showing the differential charging capacity as a function of voltage (vs. Li) for a 50/50 physical mixture by weight of $Li_{1.05}Mn_{1.995}Cr_{0.005}O_2$ and $LiNi_{0.81}Co_{0.19}O_2$. The rate of charge was such that the time to reach 4.2V was approximately 8 hours.

FIG. 13 is a dC/dV plot of a 50/50 mixture of $LiNi_{0.81}Co_{0.19}O_2$ and $Li_{1.05}Mn_{1.995}Cr_{0.005}O_2$. As expected, the curve is basically an average of the results in FIGS. 9 and 12. Very little capacity is removed above 4.3V, and this material combination is significantly safer from abuse due to charger charge voltage fluctuations (little capacity at charge voltage), overcharge ($Li_{1.05}Mn_{1.995}Cr_{0.005}O_2$ does not decompose by giving off much heat, and $LiNi_{0.81}Co_{0.19}O_2$ is much better than $LiNiO_2$ in this regard), and short circuit. Charge capacity is distributed better in voltage regime than $Li_{1.05}Mn_{1.995}Cr_{0.005}O_2$, yielding a composite with a better rate capability.

Figure 14:
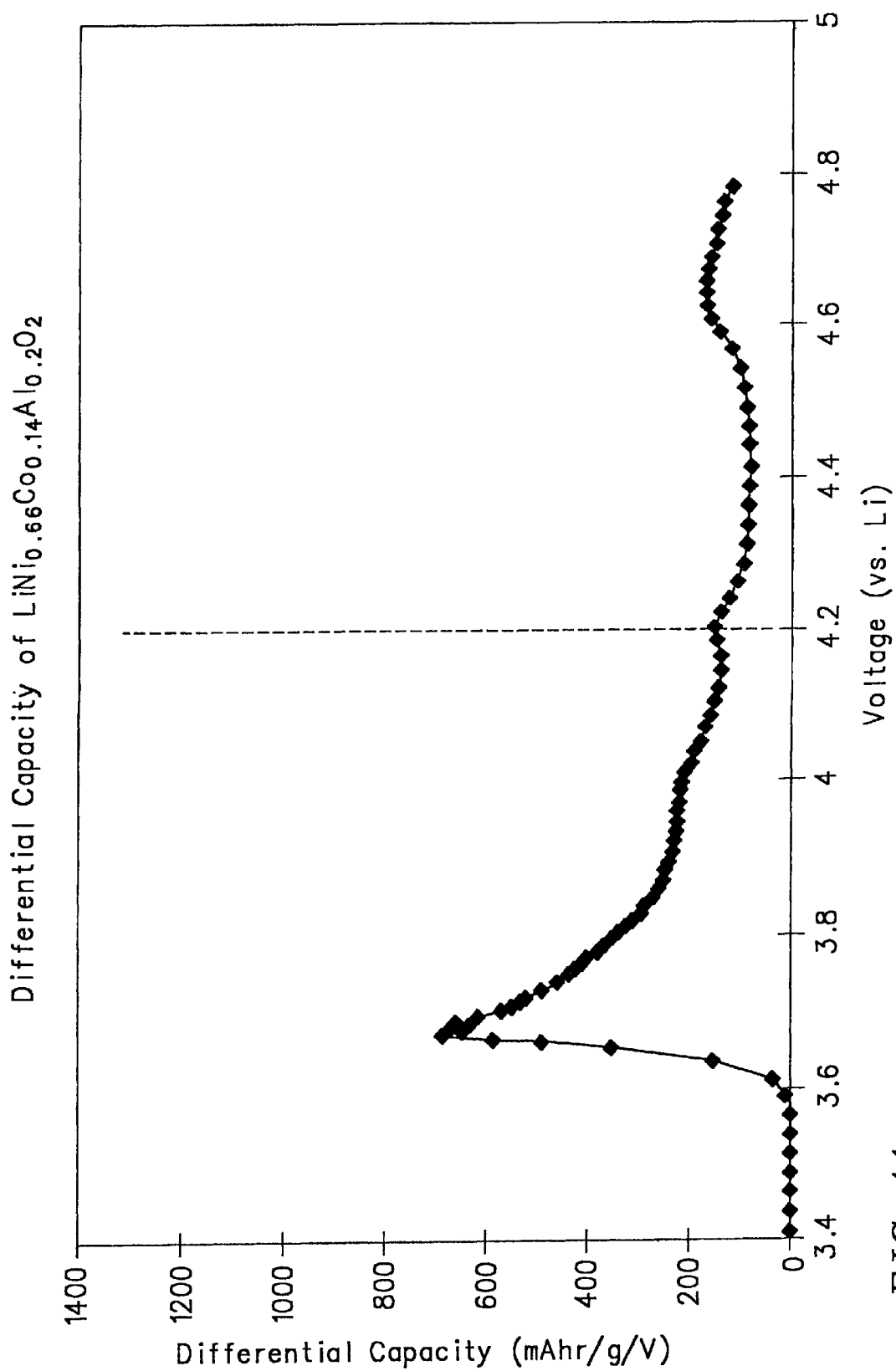
FIG. 14 is a graph showing the differential charging capacity as a function of voltage (vs. Li) of $LiNi_{0.66}Co_{0.14}Al_{0.20}O_2$. The rate of charge was such that the time to reach 4.2V was approximately 8 hours.

FIG. 14 shows the differential charging capacity of $LiNi_{0.66}Co_{0.14}Al_{0.2}O_2$. The curve shows a peak at the beginning of charge at 3.65V, a continuously decreasing differential capacity all the way up to around 4.6V. Because of the high thermal stability and absences of a differential capacity peak at 4.2V, this material is ideal for lithium ion battery application. Excellent capacity, ease of control of state of charge with voltage, and thermal stability make this material ideal.

Figure 15A:
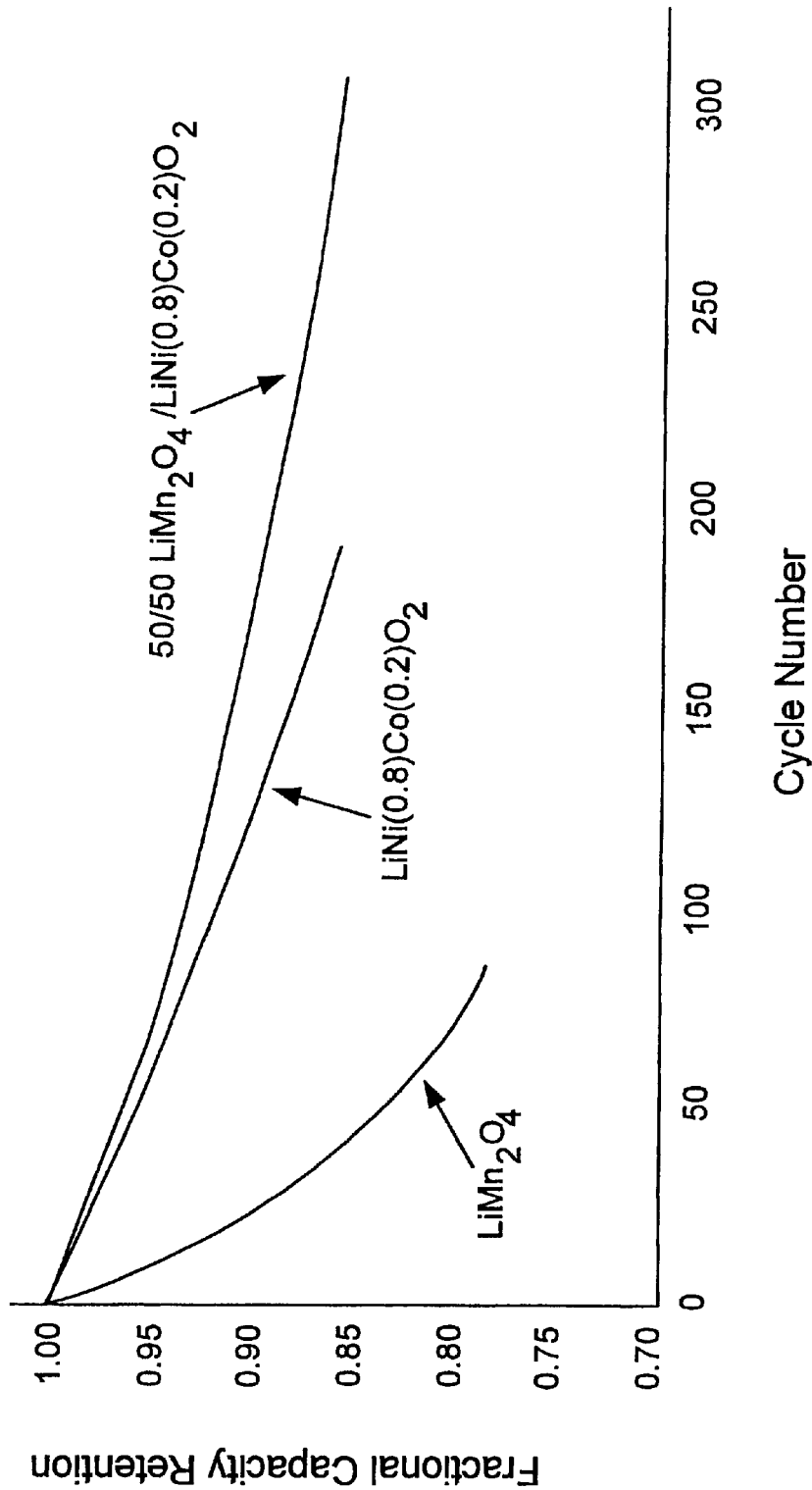
FIG. 15A is a graph comparing the capacity retention of a lithium nickel cobalt oxide positive electrode, a lithium manganese oxide electrode, and a 50:50 mixed lithium nickel cobalt oxide-lithium manganese oxide positive electrode at 50 degrees Centigrade.

FIG. 15A presents a graph showing that the capacity retention of a mixed positive electrode of this invention is better than that of either of its constituent electrode materials. The data presented in this figure was taken at 50° C. Importantly, this data shows that a mixture of lithium manganese oxide and lithium nickel cobalt oxide retains capacity over multiple battery cycles far better than lithium manganese oxide alone and significantly better than lithium nickel cobalt oxide alone.

Figure 15B:
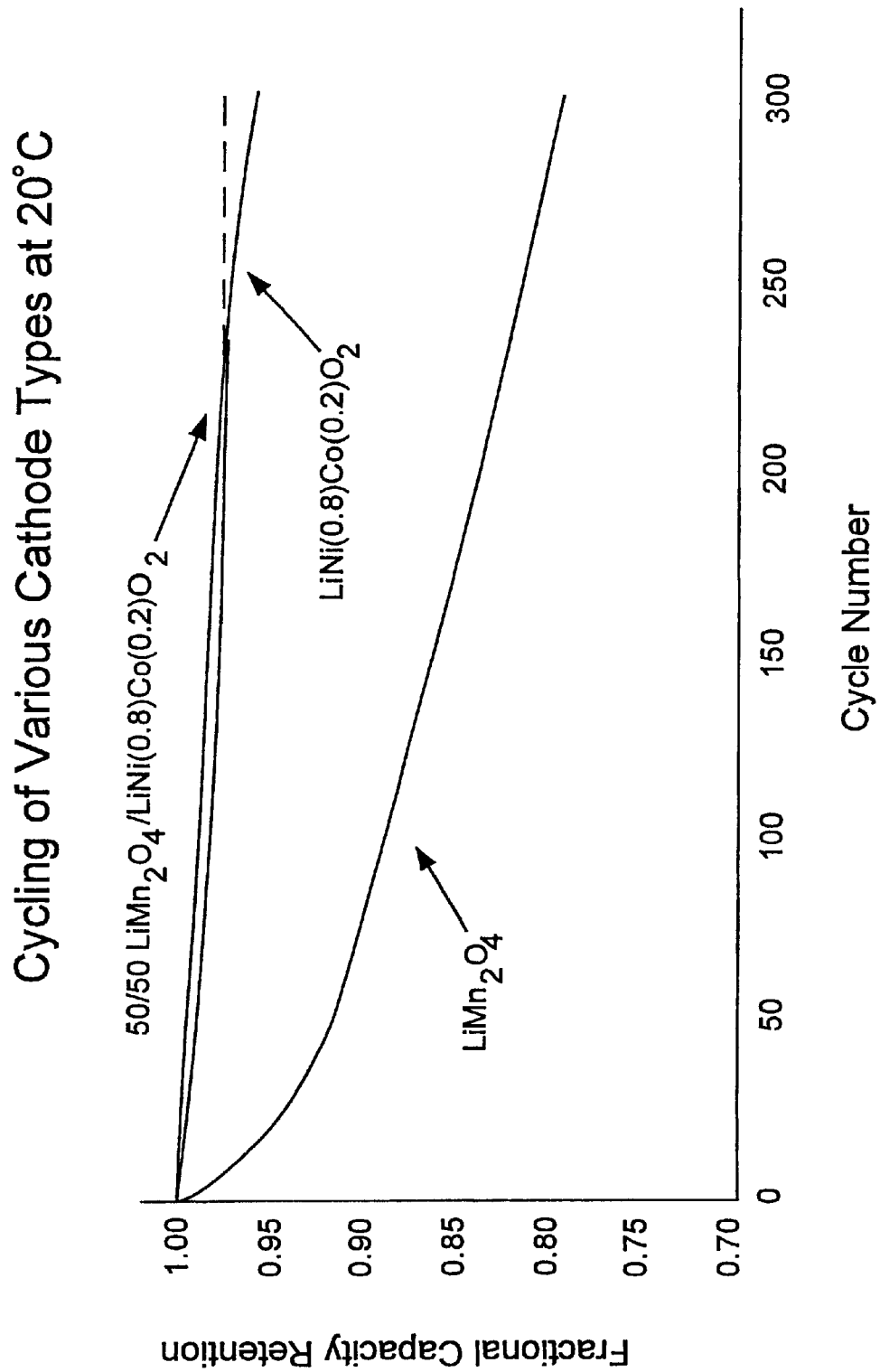
FIG. 15B is a graph comparing the capacity retention of a lithium nickel cobalt oxide positive electrode, a lithium manganese oxide electrode, and a 50:50 mixed lithium nickel cobalt oxide-lithium manganese oxide positive electrode at 20 degrees Centigrade.

FIG. 15B is a graph showing data similar to that in FIG. 15A, but taken at 20° C., rather than 50° C. While the data taken at 20° C. is not as striking as the data at 50° C., it still illustrates that the mixed positive electrodes of this invention performed better than the lithium manganese oxide positive electrodes and as well as the lithium nickel cobalt oxide electrodes.

Figure 15C:
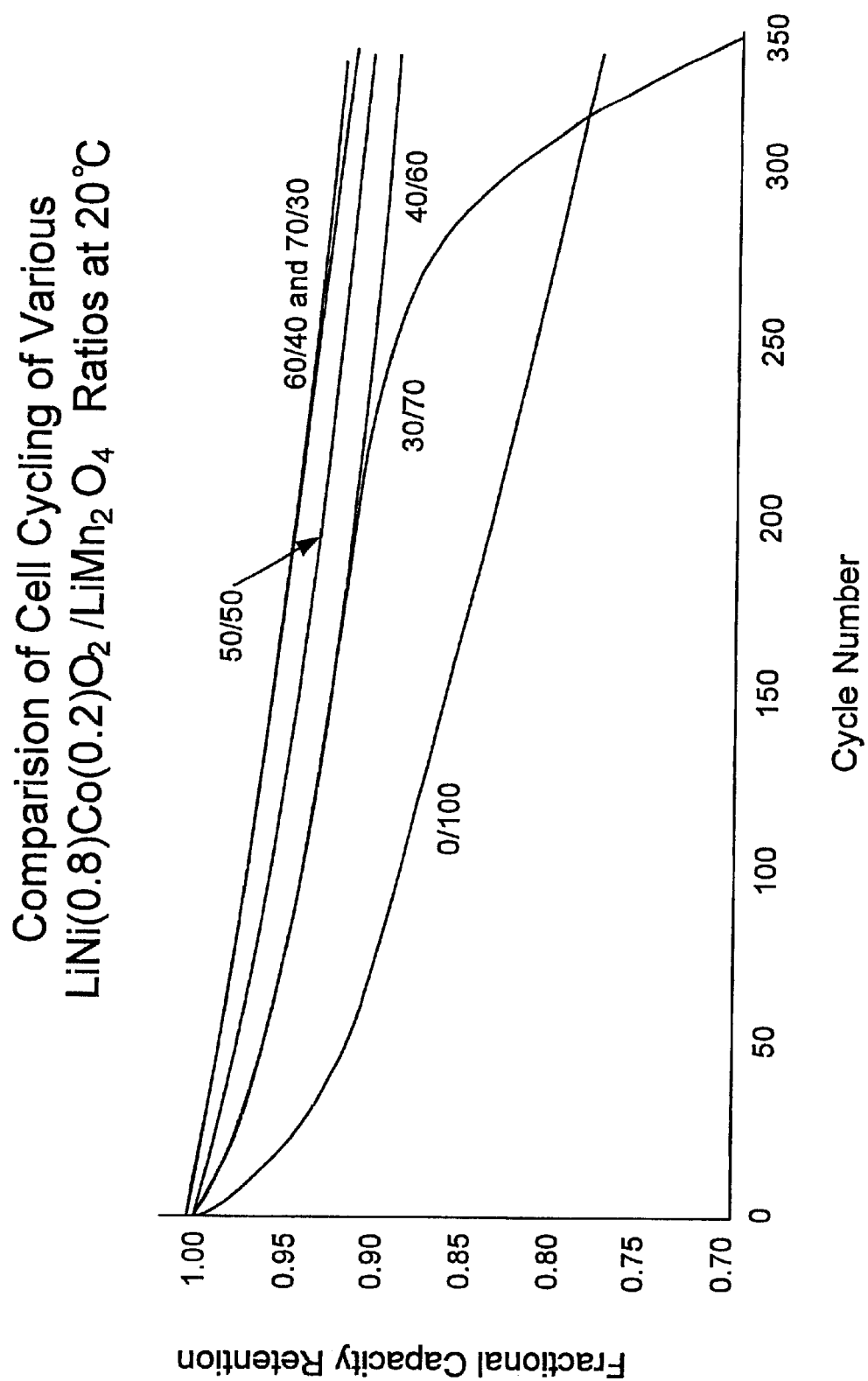
FIG. 15C is a graph comparing the capacity retention of various positive electrodes having different mixtures of lithium nickel cobalt oxide-lithium manganese oxide (20 degrees Centigrade).

FIG. 15C is a graph showing data similar to that in FIG. 15B (e.g., the data was taken at 20 degrees Centigrade). However, it includes data for additional cells with various lithium manganese oxide and lithium nickel cobalt oxide mixture ratios. This data illustrates that the unexpectedly good capacity retention exists for a wide range of cathode mixture compositions.

The experimental data shown in the graphs of FIGS. 15A, 15B, and 15C was taken from cells constructed as follows. The cells were a spirally wound (cylindrical) to dimensions 18 mm diameter by 65 mm high. The electrodes were coated on both sides onto 10 $\mu$m copper foil (the negative electrode) and 25 $\mu$m aluminum foil (the positive electrode). The electrodes were cut to length and width, wound with separator between them, flooded with electrolyte, and sealed. The cells used a thermally active polyethylene "shutdown" separator which activates at around 120° C., but no other safety device of mechanism.

The positive electrode of this invention that was used in this study included a 50:50 mixture of $LiMn_2O_4$ and $LiNi_{0.8}Co_{0.2}O_2$. For comparison, two other cells were constructed: one having entirely $LiMn_2O_4$ and another having entirely $LiNi_{0.8}Co_{0.2}O_2$ positive electrode active material. In all three cells, the positive electrode active material was combined with a carbon electronic conductor and a binder to form the complete positive electrode. Aside from the variations in the composition of the positive electrode active material, all other features of the various cells described herein were identical.

The negative electrode employed in the experimental cells used as an active material a blend of 80 percent graphite having a surface area of about 0.8 $m^2/g$ and 20 percent non-graphitic ground fibers (Fortafil). This carbon active material was combined with about 6.5 percent binder.

The electrolyte employed in the experimental cells included approximately 38 percent ethylene carbonate, 14 percent diethyl carbonate, and 31 percent dimethyl carbonate as solvent, with balance being $LiPF_6$ salt.

Cells were placed in a temperature control box with a control accuracy of +/-1° C. Cells were charged to a maximum voltage of 4.1V and held for a total charging time of 3 hours. Next the cells were immediately discharged at 1 Amp to a minimum voltage of 2.5V before repeating the charging.

In FIG. 15A, capacity retention curves for three curves are shown. In all cases, the cells were constructed and tested as described above. The only difference is the composition of the active material in the positive electrode. The capacity retention cycling tests on these cells were conducted at 50° C. The 50:50 mixture of lithium manganese oxide and lithium nickel cobalt oxide clearly outperformed both the cell employing solely lithium manganese oxide and the cell employing solely lithium nickel cobalt oxide.

In FIG. 15B, capacity retention curves are shown for three cells having the same compositions and constructions as the cells whose performances are depicted in the graph of FIG. 15A. In this case, however, the cycling experiments were conducted at 20° C. As shown, the cells containing lithium nickel cobalt oxide clearly outperformed the cell having only lithium manganese oxide as the positive electrode active material. The two cells containing lithium nickel cobalt oxide had comparable performances.

FIG. 15C shows the results of additional experiments conducted with cells operating at 20 degrees Centigrade and prepared as described above, but employing differing ratios of $LiMn_2O_4$ and $LiNi_{0.8}Co_{0.2}O_2$ in the positive electrode. Here the ratios of $LiNi_{0.8}Co_{0.2}O_2$ to $LiMn_2O_4$ was 0:100, 30:70, 40:60, 50:50, 60:40, and 70:30. As shown cells having as little as 30 percent $LiNi_{0.8}Co_{0.2}O_2$ still cluster near the 50:50 mixture, which performs nearly identically to the 100 percent $LiNi_{0.8}Co_{0.2}O_2$ cells at 20 degrees Centigrade (see FIG. 15B). Thus, a wide variety of cathode compositions containing lithium manganese oxide provide unexpectedly good capacity retention.

Various abuse tests were conducted to determine the relative safety of various mixed and unmixed positive electrode active materials. Three tests are described. In each case, the cells employed in the comparison test were identical, save the positive electrode composition.

A crush test was performed. A fully charged cell was placed between two metal flat plates and crushed using a hydraulic press, simulating cell deformation and internal shorting effects. The responses of cells having various positive electrode compositions is presented in FIG. 16A.

A 150° C. exposure test was performed. A fully charged cell was placed in an oven which was heated to 150° C. The response of cells having various positive electrode compositions is presented in FIG. 16A.

An overcharge test was conducted. Cells of 18×65 mm size with thermal shutdown separator but no pressure activated safety disconnect or PTC device were overcharged by a specified amount. These tests simulated charger control failure in the field. The responses of cells having various positive electrode compositions is presented in FIG. 16B.

FIGS. 16A and 16B show that the positive electrode compositions having even a relatively small quantity of lithium manganese oxide admixed with lithium nickel cobalt oxide are quite safe. They are certainly safer than (1) lithium nickel cobalt oxide alone and (2) comparable mixtures employing lithium nickel oxide with lithium manganese oxide. Further, in some cases, cells containing the mixture electrodes of this invention are even safer than cells containing solely lithium cobalt oxide positive electrodes. See FIG. 16B.

Although the foregoing invention has been described in some detail for purposes of clarity of understanding, it will be apparent that certain changes and modifications may be practiced within the scope of the appended claims. For instance, although the specification has primarily described electrodes for use in lithium ion cells, the positive electrode materials disclosed herein may have other applications as well. For example, they may be used in lithium metal cells. Further, other positive electrode materials including sodium, potassium, etc. may be used in place of lithium and prepared in accordance with this invention. Therefore, the present embodiments are to be considered as illustrative and not restrictive, and the invention is not to be limited to the details given herein, but may be modified within the scope of the appended claims.

What is claimed is:

1. A lithium insertion positive electrode comprising a mixture of two or more homogeneous lithium ion insertion materials, wherein at least one of the homogeneous lithium ion insertion materials is a chemical compound of the formula $Li_xNi_{0.8}Co_{0.2}O_2$ having an $\alpha$-$NaCrO_2$ crystal structure, where x is between about 0 and about 1 and can be varied within this range by electrochemical insertion and extraction, and wherein at least one of the homogeneous lithium ion insertion materials is a lithium manganese oxide chemical compound of the formula $Li_xMn_2O_4$, and wherein the $Li_xNi_{0.8}Co_{0.2}O_2$ is present in the positive electrode at a concentration of between about 30 and 80 weight percent and the $Li_xMn_2O_4$ is present in the positive electrode at a concentration of between about 20 and 70 weight percent.

2. The positive electrode of claim 1, wherein the $Li_xNi_{0.8}Co_{0.2}O_2$ is present in the positive electrode at a concentration of between about 30 and 50 weight percent and the $Li_xMn_2O_4$ is present in the positive electrode at a concentration of between about 70 and 50 weight percent.

3. The positive electrode of claim 1, further comprising carbon as an electronic conductor.

4. The positive electrode of claim 1, wherein the chemical compound is a particulate material in which the particles have an average particle size of not greater than about 50 $\mu$m.

5. The positive electrode of claim 1, further comprising a current collector.

6. The positive electrode of claim 1, wherein the $Li_xNi_{0.8}Co_{0.2}O_2$ is present in the positive electrode at a concentration of about 40 weight percent and the $Li_xMn_2O_4$ is present in the positive electrode at a concentration of about 60 weight percent.

7. A lithium ion cell comprising:

(a) a cell container;

(b) a negative electrode provided within the cell container and capable of intercalating lithium during charge and deintercalating lithium during discharge;

(c) an electrolyte conductive to lithium ions and provided within said cell container; and (d) a positive electrode provided within the cell container and capable of taking up lithium on discharge and releasing lithium on charge, the positive electrode including a mixture of (i) a chemical compound of the formula $Li_xNi_{0.8}Co_{0.2}O_2$ having an $\alpha$-$NaCrO_2$ crystal structure, where x is between about 0 and about 1 and can be varied within this range by electrochemical insertion and extraction, and (ii) a lithium manganese oxide chemical compound of the formula $Li_xMn_2O_4$, and wherein the $Li_xNi_{0.8}Co_{0.2}O_2$ is present in the positive electrode at a concentration of between about 30 and 80 weight percent and the $Li_xMn_2O_4$ is present in the positive electrode at a concentration of between about 20 and 70 weight percent.

8. The lithium ion cell of claim 7, wherein the $Li_xNi_{0.8}Co_{0.2}O_2$ is present in the positive electrode at a concentration of between about 30 and 50 weight percent and the $Li_xMn_2O_4$ is present in the positive electrode at a concentration of between about 70 and 50 weight percent.

9. The lithium ion cell of claim 7, further comprising carbon as an electronic conductor.

10. The lithium ion cell of claim 7, wherein the chemical compound is a particulate material in which the particles have an average particle size of not greater than about 50 μm.

11. The lithium ion cell of claim 7, further comprising a current collector.

12. The lithium ion cell of claim 7, wherein the $Li_xNi_{0.8}Co_{0.2}O_2$ is present in the positive electrode at a concentration of about 40 weight percent and the $Li_xMn_2O_4$ is present in the positive electrode at a concentration of about 60 weight percent.

13. The lithium ion cell of claim 7, wherein the electrolyte includes one or more of the following: propylene carbonate, ethylene carbonate, 1,2-dimethoxyethane, 1,2-diethoxyethane, γ-butyrolactone, tetrahydrofuran, 2-methyltetrahydrofuran, 1,3-dioxolane, 4-methyl 1,3-dioxolane, diethyl ether, sulfolane, acetonitrile, propionitrile, glutaronitrile, dimethyl carbonate, diethyl carbonate, anisole, and mixtures thereof.

14. The lithium ion cell of claim 7, wherein the electrolyte includes one or more of the following salts: $LiN(SO_2CF_3)_2$, $LiN(SO_2C_2F_5)_2$, $LiAs_6$, $LiPF_6$, $LiBF_4$, $LiB(C_6H_5)_4$, $LiCl$, $LiBr$, $CH_3SO_3Li$, and $CF_3SO_3Li$.

15. The lithium ion cell of claim 7, wherein the electrolyte includes a solvent mixture selected from the group consisting of (a) ethylene carbonate, dimethyl carbonate, and diethyl carbonate; (b) ethylene carbonate, ethyl methyl carbonate, and dimethyl carbonate; (c) ethylene carbonate, ethyl methyl carbonate, and diethyl carbonate; and (d) ethylene carbonate, ethyl methyl carbonate, diethyl carbonate, and dimethyl carbonate.

16. The lithium ion cell of claim 7 wherein the negative electrode includes a mixture of graphitic carbon particles and non-graphitic carbon particles.

17. A lithium insertion positive electrode comprising a mixture of two or more homogeneous lithium ion insertion materials, wherein at least one of the homogeneous lithium ion insertion materials is $Li_xNi_{0.8}Co_{0.2}O_2$ having an α-$NaCrO_2$ crystal structure, where x is between about 0 and about 1 and can be varied within this range by electrochemical insertion and extraction, and wherein at least one of the homogeneous lithium ion insertion materials is a lithium manganese oxide spinel, and wherein the $Li_xNi_{0.8}Co_{0.2}O_2$ is present in the positive electrode at a concentration of between about 30 and 80 weight percent and the lithium manganese oxide is present in the positive electrode at a concentration of between about 20 and 70 weight percent.

18. The positive electrode of claim 17, wherein the $Li_xNi_{0.8}Co_{0.2}O_2$ is present in the positive electrode at a concentration of between about 30 and 50 weight percent and the lithium manganese oxide spinel is present in the positive electrode at a concentration of between about 50 and 70 weight percent.

19. The positive electrode of claim 17, wherein the $Li_xNi_{0.8}Co_{0.2}O_2$ is present in the positive electrode at a concentration of between bout 80 and 50 weight percent and the lithium manganese oxide spinel is present in the positive electrode at a concentration of between about 20 and 50 weight percent.

20. The positive electrode of claim 17, wherein the $Li_xNi_{0.8}Co_{0.2}O_2$ is present in the positive electrode at a concentration of about 40 weight percent and the lithium manganese oxide spinel is present in the positive electrode at a concentration of between about 60 weight percent.

21. The positive electrode of claim 17, wherein the lithium manganese oxide spinel has a stoichiometric excess of lithium.

* * * * *